US011799273B1

(12) United States Patent
Hack

(10) Patent No.: US 11,799,273 B1
(45) Date of Patent: Oct. 24, 2023

(54) SYSTEM AND APPARATUS FOR MAINTAINING AUXILIARY A AND B CIRCUITS IN POWER CIRCUIT BREAKERS WHICH CAN BE RACKED OUT OF CUBICLE

(71) Applicant: National Breaker Services LLC, Middlebury, CT (US)

(72) Inventor: Bruce Hack, Yonkers, NY (US)

( * ) Notice: Subject to any disclaimer, the term of this patent is extended or adjusted under 35 U.S.C. 154(b) by 345 days.

(21) Appl. No.: 17/081,584

(22) Filed: Oct. 27, 2020

(51) Int. Cl.
    *H02B 11/133* (2006.01)
    *H01H 71/12* (2006.01)
    *H02B 11/10* (2006.01)

(52) U.S. Cl.
    CPC ......... *H02B 11/133* (2013.01); *H01H 71/123* (2013.01); *H02B 11/10* (2013.01)

(58) Field of Classification Search
    CPC .. G01R 1/0416; H01R 13/6205; H01R 12/00; H01R 12/50; H01R 12/515; H01R 12/70; H01R 13/00; H01R 13/04; H01R 13/10; H01R 13/22; H01R 13/26; H01R 13/28; H01R 13/40; H01R 13/405; H01R 13/415; H01R 13/46; H01R 13/506; H01R 13/514; H01R 13/533; H01R 24/00; H01R 24/20; H01R 24/28; H01R 24/52; H01R 24/525; H01R 25/00; H01R 4/00; H01R 4/26; H01R 4/28; H01R 4/30; H01R 4/308; H01R 4/48; H01R 4/4809; H01R 4/60; H01R 4/5066; H01R 4/2404; H01R 4/70; H01R 9/00; H01R 9/03; H01R 9/0509; H01R 9/16; H01R 9/22; H01R 9/223; H01R 9/24; H01R 9/2408; H01R 11/00; H01R 11/01; H01R 11/03; H01H 71/00; H01H 71/02; H01H 71/0207; H01H 71/0271; H01H 71/04; H01H 71/08; H01H 71/082; H01H 71/10; H01H 71/1009; H01H 71/12; H01H 71/123; H01H 9/00; H01H 9/0066; H01H 9/38; H01H 9/54; H01H 69/00; H01H 50/541; H02B 11/00; H02B 11/02; H02B 11/26; H02B 11/10; H02B 11/133
    USPC ...................................................... 200/50.24
    See application file for complete search history.

(56) References Cited

U.S. PATENT DOCUMENTS

| 4,531,174 A | * | 7/1985 | Rickmann | ............ | H02B 11/133 439/840 |
| 2014/0287602 A1 | * | 9/2014 | Pons Gonzalez | ...... | G01R 15/14 439/39 |

* cited by examiner

Primary Examiner — Anthony R Jimenez
(74) Attorney, Agent, or Firm — Law Office of Andrew S. Langsam PLLC; Andrew S. Langsam

(57) ABSTRACT

A system and apparatus for maintaining the desired synchronous and asynchronous A and B auxiliary electrical circuits, respectively, by use of connector block halves, one connector block half being connected to wiring out for auxiliary circuitry and being secured to the movable circuit breaker and the other auxiliary connector block half also being connecting to wiring out for auxiliary circuitry and secured to the relatively stationary wall or surface of the cubicle, where the connector block halves have some portion of its contacts of the "make before break" type so that the A and B auxiliary circuits operate as intended when the connector halves are connected and the A and B auxiliary circuits still reflect the proper condition, synchronous or asynchronous, of the A and B circuits, respectively, even when the auxiliary connector block halves are physically and/or electrically separated from one another.

17 Claims, 8 Drawing Sheets

SYSTEM AND APPARATUS FOR MAINTAINING AUXILIARY A AND B CIRCUITS IN POWER CIRCUIT BREAKERS WHICH CAN BE RACKED OUT OF CUBICLE

TECHNICAL FIELD

The present invention relates to a power circuit breaker and electrical system and apparatus for maintaining desired electrical contact(s) and maintain current flow when the breaker(s) are in a closed position (for allowing electrical power to flow) and, yet, breaking of a complete circuit(s) when conditions require or are desired, to stop current flow. The latter can happen in a dangerous or unacceptable situation, just as most circuit breakers operate. However, the present invention is related to large power circuit breakers (not residential individual circuit breakers) of the withdrawable (draw-out from a cubicle or cabinet) type and, in particular, to those which have one or more auxiliary circuits to the main or primary circuits being monitored, with those auxiliary or secondary circuits supplying technicians and operators with information of current flow or circuitry for other reasons. Generally, at least, the auxiliary circuits provide information regarding the status of the main circuit breakers.

For myriad reasons, there is a need to have lower voltage and lower current signaling electrical contacts that work in parallel with and mirror (or anti-mirror) the actions of the circuit breaker's main or primary electrical power circuitry and contacts. These various and so-called auxiliary or secondary signaling contacts will find themselves wired into control, protection and communication circuits so that they can "tell" those circuits that the main or primary breaker's main contacts are Open and/or Closed. Depending on the complexity of the control, protection and communications circuitry which surround the system needs of the main circuit breaker—the quantity of these required auxiliary contacts can reach up to a dozen or even two dozen.

The electrical power and control industry inserts and adds such additional, secondary or auxiliary contacts to work with the Main or Primary Circuit Breaker by mounting a multi-stage, two position auxiliary switch on a stationary side wall or a floor of the cubicle, chamber, cavity or container for the primary circuit breakers which are housed in the switchgear cubicle. The circuit breaker is then supplied with some sort of mechanical arm or linkage that moves in a binary way such that when the main breaker closes—the arm moves into an activated position and when the main breaker opens—the arm returns to a rest position. This arm movement in turn is moving the two position auxiliary switch(es) such that its contacts will be in either position 1 or 2. Generally, these two-position auxiliary switches will be spring loaded to return to the rest state whether moved there by mechanical action of the breaker's linkage arm—or simply left alone (if the breaker is removed from the cubicle, cell, or cavity for example).

The auxiliary switches/contacts can and are to be hard wired and configured such that some contacts are electrically open when the main breaker is open and some auxiliary contacts will be electrically closed when the main breaker(s) is(are) open. And then, vice versa. This allows for a digital output of "1" or "0" for either condition of the main breaker. This is equivalent in digital logic to "If/Then" and "If Not/Then."

Those auxiliary contact switches and a mechanical arm for cooperating therewith, when used in a draw out switchgear applications, are known in the Electrical Power and Control Industry as M.O.C. switches with M.O.C or MOC standing for "Mechanism Operated Cell" switches.

In these systems, the wired auxiliary or secondary circuits are of two types, one or more "A" circuits which is(are) open or closed in synchrony with the open or closed status of the main circuit breaker(s) and one or more "B" auxiliary or secondary circuits which are desirably directly opposite in condition to the status or "open or closed" condition of the main circuit breaker, i.e., they (the B circuits) close (complete their circuit) when the main circuit breaker opens and they (the B circuits) are open when the main circuit breaker closes. As stated previously—the current industry standard is to fix mount the two stage switch in a stationary configuration on one of the circuit breaker's inner cubicle walls or floor. The switch is then moved into one of the two binary conditions by some mechanical linkage that emanates from the circuit breaker itself.

It has always been known that having the switch mounted on the breaker itself would alleviate many of the mechanical adjustments, maintenance and repair issues associated with this mechanical interplay between the moving breaker's linkage and the cubicle's stationary mounted switch.

However, a "problem" with the prior art power circuit breakers, solved by the present invention, is that when the prior art breakers are entirely removed or racked out from the containing cubicle, cavity, cabinet, or housing, etc. and thus removed from electrical connection with the power source, for maintenance, repair or replacement, while the A auxiliary circuits will still reflect an open circuit, properly in synchrony with the status of the open or racked out circuit breaker(s), the auxiliary B circuits will also reflect an open status—as if the electrical current flow is stopped, too. Yet, it is desirable for the B circuits to be maintained in an opposite (asynchrony) condition to the open (racked out) status of the main circuit(s)—a consequence of the racking out of the circuit breakers from the housing or cabinet. So, when the power circuit breaker is racked out from its cubicle or cabinet, it is still desirable and the object of the present invention for the B auxiliary circuits to continue to reflect that they are closed and to complete their circuit(s) so as to still provide desired information to the technicians.

As mentioned, since and when (for various reasons) the main circuit breaker of the prior art is racked out of its cavity, cubicle, housing or container, without the present invention, the open status of the main circuit breaker will be in synchrony, not opposite, to the status of the B auxiliary circuits. This is undesirable. Stated differently, when the circuit breaker is racked out of its cavity, and thus the main circuits open, the B circuits, prior to the present invention, are no longer directly opposite to the status of the main circuit—rather they will reflect that they are opened, too, (unless, as discussed below, the device is provided with a mechanical arm to maintain the B circuit in an opposite condition to the open status of the main circuit breaker).

This can be resolved, as it has in the past, with a mechanical operating device for the B auxiliary circuits (a physical lever or arm on the movable circuit breaker connected to a device on the inside of the cubicle or cavity or vice versa) which accommodates and compensates for the physical racking out of the circuit breaker from its cavity. However, such a mechanical arm and its linkage obviously has drawbacks compared to an elegant, simple and electrical-based solution as provided by the present invention.

The prior art mechanical interplay between the circuit breaker's linkage arm and the auxiliary multi-contact (MOC) switch mounted on the cell wall or floor is an historically well-known point necessitating regular mechanical inspection, sometimes replacement or repair and maintenance. That, too, is undesirable.

Thus, a system and apparatus to avoid this maintenance-prone condition would be desirable. And avoidance could be gleaned via mounting the two position, multi-stage auxiliary switch directly on the breaker such that its digital action would be initiated by the same mechanism that activates or couples the main breaker contacts and negates the inter-cell linkage.

Since this narrative is focused on draw-out breakers, it is noted that for such power circuit breakers, all contacts, both main and auxiliary need to have an electrical coupling connection so that the entirety of the breaker can be removed from the cavity or cubicle. Breakers will regularly be removed for replacement, maintenance or safety (and thus letting personnel know for sure that the cubicle is empty and therefore the main circuit is de-energized is important).

Conventionally, then, when uncoupling the auxiliary switch circuits—all circuits, whether of the A (synchronous) or B (asynchronous) types will become "Open" and therefore any contacts that were designated as B contacts (i.e. being ordinarily "Closed" when the main breaker is Open) will no longer function properly as B contacts. This is wholly undesirable and destroys 50% of the control or auxiliary circuit logic scheme.

Thus, the present invention is directed to a power circuit breaker of the racking out type having A and B auxiliary circuits which, when the circuit breaker is racked in and fully operational, has the A circuits matching (in synchrony) with the open or closed condition of the main circuit breaker, has the B circuits opposite to the open or closed condition of the main circuit breaker (not in synchrony, but opposite, i.e., in asynchrony) AND, in addition, provides an electrical and elegant solution so that the B circuits are closed or opposite (remain in asynchrony) to the open condition or open circuitry of the main circuit breaker when the circuit breaker is racked out of the cavity normally holding the same.

The present invention provides for a primarily electrical, i.e., non-strictly mechanical system and apparatus for ensuring that the A and B auxiliary circuits are maintained, (in synchrony for the A circuits) and opposite (for the B circuits) with the main circuit breaker's condition, when the circuit breaker is fully operational, and racked into the cavity, AND also allows the A (in synchrony) and B auxiliary circuits (in asynchrony) to reflect that the A's are in synchrony and the B's are opposite to the main circuitry, even when racking out is the condition of the switchgear. The B circuits will be maintained opposite to the main circuit condition even when the circuit breaker is racked out of the cavity and the main circuit breakers and A auxiliary circuits are thus open. This system and apparatus allows and dictates that the A auxiliary and B auxiliary circuits are properly reflective of the status of the system when the circuit breaker is racked into the cubicle or cavity and still is operational as desired when the system is racked out of the cubicle or cavity.

The present invention includes a pair of mating electrical conductor blocks, one (the movable block) preferably secured on the rear bottom or near the base of the movable carriage or trolley of the circuit breaker with respect to the cubicle or cavity and the other and mating stationary conductor block preferably secured to the wall or floor of the cubicle or cavity into which the movable circuit breaker racks in and out. Of course, the circuit breaker device and the enclosure or cubicle as well as these (movable and stationary) and other connectors for power, need to mate, both physically and electrically to provide power and be secure and safe. It is the physical mating that allows the electrical parts to connect to each other and thereby have the capability of completing one or more electrical circuits. Once the circuit breaker is racked into the cubicle, it can be operated such that the main or primary power circuit is commenced and can be turned "on" and "off." Drawing out of the cubicle type switchgear has a superior benefit that any need to replace or maintain the breaker can be easily done by simply racking the breaker out and putting in a replacement, then racking it back into the cubicle and then energizing the circuit breaker back on. Then one can take the removed breaker away for refurbishment or discarding. Because the breaker in these environments has the ability to be fully removed from the cubicle or cavity, any connections that are required between the breaker and the cavity or cubicle or cell must be able to be easily and quickly physically detachable and so, too, any main electrical circuitry. In that connection, that term "detachable" means un-plugged or removed from completion of a main circuit.

The stationary electrical contact or connector half of the two-part A and B auxiliary contact connector assembly can be secured on any wall, ceiling or the floor of the cavity or cubicle. The other (the movable) electrical connector half needs to be capable to align with the stationary half and it, the movable connector half, is mounted onto the movable circuit breaker which travels into and out of the housing or cubicle. The two mating electrical connector halves or parts; one on the breaker which moves in and out of the cubicle and the mating component which is stationary and secured to the inside housing of the cubicle or cavity, provide secure connections for the A and B auxiliary circuits. When connected and mated, these electrical conductor half "blocks" allow contacts for auxiliary or secondary wiring-out of circuits of the A and B type.

The mating auxiliary electrical connectors include as part of the totality of the individual contacts within the overall contact block structure a certain number of contacts that are of the "make before break contact" type. Representative of such electrical connector blocks with shorting clips also known as "make before break" contacts are available from Wain Electrical Co., Ltd. Of 759-3, Chengbei Industry Zone, Chanyuan Road Xiamen, Tong' an District, Xiamen, China, and have current part numbers: HEE 046FC and HEE 046MC. These mating components, female and male electric block connectors, are referred to as Female and Male 26 Pin, 20 amp, 500 V connectors, some of which female connector blocks have the metallic shorting contacts. The make before break contacts for the B circuits are provided to one portion of the conductor blocks, yet, by design, are disabled, unless and until the half blocks are separated. A set of insulating walls or fins on the opposed and separate male connector block prevents the make before break contacts of the female connector block half from shorting or completing the B circuits. However, separation of the female connector block half from the male connector block half allows the make before break shorting clips to become effective to completion of the B circuits. So when the conductor blocks are mated (when the circuit breaker is racked into the cavity) the B auxiliary circuits are not shorted but, as desired, are in asynchrony to the open or closed condition of the main circuits. However, when the fins or insulating walls of the movable connector block half (the male connector block half) are removed from the other and stationary connector block half (the female with the make before break shorting clips, the make before break contacts (which can be referred to as shorting clips) come into play and allow the completion of the B circuits so that the B auxiliary circuits will still reflect closed circuits even though the circuit breaker is racked out of the cavity. The mechanical/electrical interaction of the make before break contacts of the stationary connector block half and the insulating and separating walls or fins of the movable connector block half allow for the B circuits to be open or close in asynchrony to the open or closed condition of the main circuits' condition even when the circuit breaker is racked into the cavity and, yet, when the conductor block halves are separated, as would happen when the circuit breaker is racked out of the cubicle or cavity, the make before break contacts complete the B auxiliary circuits. Thus, the B auxiliary circuits will be closed even when the circuit breaker is removed from the cavity. When the conductor block halves are mated and connected with the circuit breaker within its cubicle or cavity, the make before break contacts are electrically isolated and ineffective as a consequence of the interaction of the insulating walls or fins of the movable connector block spreading and separating the metallic shorting clips from forming a complete short circuit in the B circuits of the stationary connector block half. Yet, as is apparent, the make before break contacts result in a complete B circuit when the blocks are physically separated from one another and the isolating fins or walls removed, as what happens when the circuit breaker is racked out of the cavity. It is to be clearly noted that by definition—the racked out circuit breaker must be open, and therefore the B contracts must remain closed.

Stated differently, the make before break contacts are electrically isolated from the wiring out of the auxiliary B circuits when the circuit breaker is racked in but if the contacts of the connector blocks are physically separated (as what happens when the racking out of the circuit breaker occurs from the cubicle or cavity) then the shorting clips are no longer isolated and they indeed come into contact with the wiring out circuits to result in a complete auxiliary B circuit. In this manner, these auxiliary circuits, B circuits, are again opposite or asynchronous, as desired to the condition of the circuit breaker, even when there is a complete racking out.

When the circuit breaker is racked in, the make before break contacts are isolated. When the connecting block halves are connected, the auxiliary B circuits maintain a closed or open circuit electrical flowing condition in asynchrony to the open or closed condition of the main circuit(s). When the movable contact block half is withdrawn from the stationary contact block half, the isolating walls or fins of the movable contact no longer isolate the make before break contacts from the hard wiring and the metallic make before break contacts actually complete the auxiliary B circuits. Yet, the make before break contacts are electrically isolated from the B circuits (by the walls/fins) when the two conductor half-blocks are mated (when racked in) and the B circuits thus are in opposition to the condition of the main circuitry, as desired.

The present invention contemplates the use of available "make before break contacts or shorting clips" in mating electrical connector blocks employed for draw out circuit breaker MOC "B contacts". To the inventor's knowledge these have never been considered before in the removable (draw-out) power circuit breaker field in connection with the auxiliary MOC circuitry. It is to be pointed out that such Make Before Break contacts are known and proven solutions in the electrical power industry for Current Transformer circuitry that goes to devices such as Relays and Metering.

And, while a specific mechanism for the present invention is disclosed, it should be appreciated that any form of electrically and physically/mechanically "make before break shorting contacts" or equivalent electrical mechanisms in the control of B circuits will achieve the desired goal. This is among the principal aspects of the present invention.

Another aspect of the present invention is the use of an integrated, available-from-the-front of the movable circuit breaker, mechanically advantaged lever arm which leverages about a fulcrum (preferably a piece of metal or hard rubber) located and secured on the front panel of the movable circuit breaker. This arm, in the form of a hinged and segmented rod, allows for the quick and easy connection and disconnection of the mating, auxiliary circuit connector block halves. This allows for a simple Test Condition of the wiring of the device. It should be appreciated that the connector blocks, with multiple electrical pins or rods frictionally mating into the same number of electrical receiving bores, can be very hard to pull out and plug in without mechanical advantage. The tolerance here is generally low to ensure proper and complete electrical connections. Thus, a simple, hand-operated mechanism is provided for securing the connector blocks together when the circuit breaker is racked into the cubicle and for separating the connector blocks when the circuit breaker is desirably racked out of the cubicle. One end of the rod is connected to the movable block connector half (preferably at its rear or side walls) and the other end of the rod extends longitudinally forwardly to and through the front panel of the circuit breaker where it is preferably provided with a handle. A pair of U-joints can be provided to the rod segments to allow the long rod to fold and unfold at the U-joints. Thus, the section outside of the front panel of the rod can be hinged and secured or stored in place on the front panel of the circuit breaker when not in use. The U-joints, when the rod is extended as when the segments are aligned, also allow the lever arm to be used for pushing the movable connector half towards the stationary connector half for electrical and mechanical connection. The same rod is primarily also used for pulling the connector halves apart. The U joint closest to the movable connector block, the distal U-joint, unfolds and folds the balance or handle of the rod. The proximal U joint (closest to the handle) is the one that allows bending of the rod so as to be able to use the fulcrum, when disengaging the two connector blocks is desired. For the latter, the extension handle can be bent at the U-joint and part of the rod is capable of being placed across and atop the fulcrum on the front panel. Pushing on the rod and its handle against the fulcrum allows the other and distal end of the rod to pull the "movable" electrical connector half apart from the stationary electrical connector half. Thus, mechanical leverage will allow for ease of separation of the connector block halves. Pushing inwardly on the handle segment of the rod, with part of the rod leaning against the fulcrum, will allow the rod end secured to the movable connector half to detach from the stationary electrical connector block half. The U-joints allow the forward projecting segment of the rod or handle end of the rod to be space-efficiently then turned upwardly and secured to the front of the panel of the circuit breaker. This three-segment rod and front mounted fulcrum allows the easy separation of the conductor blocks when racking out is desired (using the fulcrum for leverage). The rod, when extended forwardly allows for ease of electrical and mechanical disconnection of the connector block halves (connecting the A and B auxiliary circuits) when the circuit breaker is racked in. This allows for ensuring a Test Condition.

Background

In power distribution systems, there may be faults or defects that produce an excess current. For example, a common fault may be in the form of a short circuit (sometimes resulting from an overload) which causes an electrical current to travel along a path having no (or extremely low) electrical resistance or impedance. Such excess current may run through and cause damage to the electrical equipment or may overheat the wire that it is traveling through to power one or more circuits, possibly even starting a fire. The problem may be exacerbated by the fact that if the excess current is permitted to run freely throughout the power distribution system, large amounts of electrical equipment, devices, wires or anything else connected within the distribution system could be damaged due to the excess current (due to their interconnectivity).

As such, to reduce the amount of damage to the system caused by the excess current, one or more switchgears (power circuit breakers) can be placed at strategic locations within the electrical system. The switchgear may be a combination of any one of circuits, fuses, switches, and/or breakers that function to protect, control and/or isolate electrical wiring and equipment. When the switchgear detects an excess current, the switchgear activates (generally thought of as the circuit breaker "opens") to isolate the part of the system from which the excess current originated. Such action prevents the excess current from traveling to other parts of the system thereby limiting the potential damage. More specifically, switchgear perform the isolation via one or more circuit breakers contained therein. The circuit breaker(s) is(are) normally housed in a cubicle, housing, cabinet, or cavity. The circuit breaker activates or opens to create a break in the circuit that forms a part of the electrical system when an overload condition occurs. As is known, when the break in a circuit occurs, the current immediately stops flowing. This interrupts the excess current for that circuit, and therefore prevents the excess current from flowing into another portion of the system. This is intended to reduce damage to the overall system.

Circuit breakers can be grouped according to voltage classes, such as low (0-1000V), medium (1001V through 52 kV), and high (generally above 53 kV). Common types of circuit breakers include air circuit breakers, vacuum circuit breakers, oil circuit breakers and gas circuit breakers. While many switchgears have built-in, fixed mounted, bolted in circuit breakers, there are also circuit breakers (switchgear) designs that are not built such that the breakers are bolted into place and fixedly mounted into the switchgear itself. In other words, the circuit breaker may form a separate, physically independent and movable component from the switchgear cubicle or housing. As such, an advantage of this configuration is that the circuit breaker can be more easily removed from the switchgear's cavity, cubicle or holding compartment for maintenance, repair or even swapped with another circuit breaker as may be required.

Medium voltage circuit breakers and switchgear are produced and supplied in myriad forms for various environments and applications. In numerous applications the breakers are bolted in place and fixed into some sort of appropriate enclosing housing often called a cubicle, cabinet or cavity. An additional popular design configuration is known as draw-out. This is when the circuit breaker device is built such that it is integrally mounted on some sort of trolley or carriage that can be either inserted into or removed from the enclosing cabinet it was built to work within. Cabinets for draw out circuit breakers are generally known by the names—breaker enclosure—breaker cubicle—circuit breaker cell—or circuit breaker vertical section. These are all used interchangeably as synonyms. Circuit breakers are generally known by that term, as well as simply 'breakers' "interrupting devices" "short circuit protecting device." The act of moving a breaker into or out of its cubicle, cavity, housing or cabinet, i.e., its enclosure is known as "racking" a breaker in or out, respectively. For the majority of applications, the "racking" process takes advantage of wheels on rails and some form of rotatable rod with screw threads extending front to rear of the trolley acting in combination with a stationary bolt on the inside rear wall of the housing. Or some other racking in or out device is used. The turning of the long rod causes the breaker "trolley" or "carriage" to be grabbed by the bolt in the enclosure and thereby the two entities pull together—or force themselves apart as the case may be (depending upon the direction of rotation of the rod vis a vis the threads of the bolt). Circuit breakers and switchgear of this kind are referred to as "draw-out switchgear"

When discussing draw out switchgear, it is to be understood that the breaker device and the cubicle, enclosure or housing therefor need to "mate" both physically and electrically. It is this physical mating that allows the electrical parts to connect to each other and thereby have the capability of completing an electrical circuit(s). Draw out switchgear has as a superior benefit that any need to replace or maintain the breaker components can be easily done by simply racking the breaker out—removing the damaged circuit breaker component, putting in a replacement—and racking the circuit breaker back in. Then, one can take the removed breaker away for refurbishment or discard.

Because the breaker has the ability to be fully removed from the cubicle—any electrical and physical connections that are required between the breaker and the cell MUST be able to be physically and electrically severed simply, quickly and without fear of current or voltage risks.

The removal of one or all of the circuit breakers from the switchgear's cubicle or cavity is often referred to as "racking out" while moving and replacing the switchgear and circuit breakers into the cubicle or cavity or holding compartment is often referred to as "racking in." Thus, the circuit breaker is rack-able in and rack-able out of the cubicle.

These switchgears and power circuit breakers are desirably also provided with auxiliary circuits for providing, for example, indicia of the status of the circuit breaker(s), to provide other information or for other circuits to be selectively powered. These auxiliary or secondary circuits (in contrast to the main or primary circuits) are referred to as A circuits and B circuits. Generally, these auxiliary circuits are of low voltage and low amperage. Desirably, the A circuits are in synchrony with the condition of the main circuit breaker. So, for a simple example, if the first auxiliary A circuit is connected to a remote but wired-to green LED light, it will be illuminated when the corresponding main or primary circuit of the circuit breaker is closed or operational and all circuits have current flow. If the circuit breaker changes its status, because of a fault, surge or other current continuity stoppage condition, the circuit breaker will switch from "closed" to "open" and the auxiliary A circuit and the green LED light will go dark or become an open circuit (the A auxiliary circuit being in synchrony with the condition of the main circuit breaker). The LED will no longer be illuminated.

In addition, if the auxiliary and secondary circuits, referred to as, a B circuit, is wired out or connected to a red LED or an audible alarm, for example, they will normally be open or off (indicative of a lack of a complete circuit) when the main circuit breaker is closed and fully operational. However, if the circuit breaker changes to an open condition, detecting an excess surge, for example, then the auxiliary B circuit, normally open (opposite to that of the main circuit breaker's closed condition) will change to a closed condition (lighting the red LED and sounding the audible alarm) when the circuit breaker changes from closed to open. Again, the B auxiliary circuit is opposite or in asynchrony to the condition of the main circuit breaker. B circuits are intended to be open when the main circuit is closed and closed when the main circuit is open. However, when the circuit breaker is racked out of its cubicle or cavity, the B circuits reflected, in some prior art attempted electrical systems, that the B circuits are open. That resulted in an absence of asynchrony between the circuit breaker condition and the auxiliary B circuits. This was undesirable. Thus, mechanical solutions to that problem were sought.

As a consequence, substantially all manufactures to date mount a two position, multi-stage switch on the inside wall of the circuit breaker cubicle and design the movable breaker with a corresponding component to interact with the switch. Each of those components have a part mounted on them such that when the breaker closes and is racked into the cubicle—it moves its mounted part that engages with and moves its interconnecting partner on the multi-stage switch to toggle that switch into its active or switch closed position. The A circuits are closed when the circuit breaker is closed. When the circuit breaker turns "OFF" after detecting a high voltage surge, for example, the mounted part returns to its "rest" position and the multi-stage switch has a spring on it that pulls it back to its rest position. Therefor this switch is not forced to be open or closed—but simply returns to its rest state, i.e., if the breaker is turned off or if the circuit breaker is removed from the cavity, cubicle or cabinet. This multi-stage switch which is operated by the mechanical position or motion of the breaker and interconnecting components on the breaker and the inside wall of the cubicle are known in the industry as an MOC switch (Mechanism Operated Cell) switch(es). Because the MOC switch is fixedly mounted inside the cubicle and because the MOC switch's normal rest position is achieved regardless of the circuit breaker being in the cell—the MOC switch B contacts which are CLOSED when the breaker is OPEN will maintain their status as B contacts even when the breaker is turned OFF or Open and indeed even if the breaker is removed from the cell.

It is well known that for various reasons the interface between the breaker and the MOC switch eventually creates maintenance issues and it would be better if the multi-stage switch was simply mounted on the breaker trolley. This would allow for a simple on-board connection between the breaker mechanism and the MOC switch that would not have to interplay between the moveable trolley and something mounted to an inner wall of the stationary cubicle. There are however two well-known shortcomings of this line of reasoning and they are so pervasive that the historic method of creating and installing an MOC switch continues to the present. One problem is that all of the wires for the auxiliary A and B contacts of the MOC switch will need to be Unpluggable. That is to say that if as an example there are 6 contacts on an MOC switch needing 12 wires—those 12 wires emanating from the MOC switch, if it is mounted on the trolley—will have to be able to unplug from the circuits as they leave the breaker and run to the outside world. This problem can and has been addressed with newer style multi-point contact blocks that would allow ½ of the contact block assembly to be "movable" and mount on the breaker trolley and the other ½ of the contact block assembly to mount stationary to an inner wall of the cubicle. As the breaker "racks in" each ½ is mounted on a guide system or bracket that aligns the two halves and smoothly inserts the "male" connector into its "female" counterpart.

Problem two is more nuanced and the basis of the present invention. The MOC switch provided auxiliary A and B contacts that need to maintain their circuit continuity regardless of the position of the breaker. "A" contacts must be open when the breaker is open or even removed from the cubicle and closed when the breaker is closed (but the breaker is never closed when it is removed from the cubicle so the A contacts will simply-remain OPEN). However, the B auxiliary contacts must open when the breaker is closed—and must be closed when the breaker opens AS WELL AS when it is removed from the cubicle. Up until the present invention—when the two halves of the secondary or auxiliary contact assembly plugs would pull apart—the B circuits would come undone and electrically OPEN up—thereby losing the proper B indication. This is quite undesirable and has forced the industry to continue to employ an inner wall mounted fixed and mechanical MOC switch.

The present invention takes advantage of a type of contact structure known as a "make before break shorting contact." The secondary or auxiliary circuits are provided by a pair of mating ½ electrical connector blocks, one with male plugs and the other with female receiving bores for coupling (during racking in) and making a complete circuit when the two halves are connected. The connector blocks of the present invention have a series of normal male plug and female bore or socket connections built into them and screw type terminal points for landing or holding the wiring connection of secondary control circuits (LED lights, for example), These screw type terminal points can be wired to the circuitry of both the movable and stationary portions of the main switchgear devices (i.e., the breaker trolley and stationary cubicle). Herein, again it is noted that the movable half of the contact block assembly will have a portion of its contact pins to be determined as either A or B contacts by having those pins wired to the two position multi-stage MOC switch which generates those secondary contact functions in synchrony or asynchrony to the main circuit breaker contacts. One of the mating halves of the auxiliary connector blocks is mounted to the movable circuit breaker. The other mating half of the auxiliary connector blocks is mounted to the inside and stationary wall of the cubicle. For illustration, assume the movable connector half is provided with the male pins for receipt by the female bores of the other half connector block and the latter is secured to the stationary side or rear wall of the cubicle. Hard wiring and wire securing positions are provided to the connector block halves. These provide the circuit continuity for the auxiliary circuits.

However, the half of the connector blocks, preferably the half with the bores, at least for the B circuits, have "make before break" shorting contacts. These are metallic components of the female half of the assembly that mounts in and on the interior stationary wall of the cell. A set of plugs are components of the male connector block, secured to the movable circuit breaker, in mating relation to the female half component of the stationary cubicle. The pins and the bores (all metallic for circuit continuity) complete the circuits of the A auxiliary circuitry. A portion of the connector blocks secured to the movable circuit breaker is also provided with some mechanism, here a set of fins or projecting walls of insulative material, which when the connector block halves are connected, insulate the shorting clips from the B circuits and allow the pins and the bores to complete the B circuits. Now—when the breaker is racked in, the connector block halves couple, pins into bores, and this makes up all of its electrical connections, both power and control—all circuits work as desired.—"A" circuits in synchrony with the circuit breaker condition and "B" circuits in asynchrony with the primary circuit breaker status or condition. When the breaker is racked out, the halves of the auxiliary electrical connectors for the circuits separate, and when the circuit breaker is removed from its cubicle, the shorting contacts in the half of the connector fixedly mounted in the cell will continue to keep those B circuits closed and effectively all B circuits remain closed B circuits, in asynchrony to the status of the main or primary circuits. The stationary set of bores and connected pins will now send the proper A & B signaling throughout the full control scheme even though the connectors have been pulled apart and the continuity with the on board MOC has been severed In the prior art, mechanical means have been provided to maintain synchrony between the status of the main circuit breaker and it being racked out and the status or condition of the auxiliary B circuits. These can be problematic as mechanical systems need attention, often repair, and can be unreliable.

The present invention is directed to an electrical system and apparatus for maintaining the B circuits in asynchrony, i.e., closed even though the main circuitry of the breaker is open due to racking out, i.e., even when the circuitry of the switchgear or main circuit breaker is physically removed or racked out of the cavity normally holding the same. Again, since the main circuit breaker is open when the racking out occurs, it would be desirable to have the B circuits still operational and closed. Normally, the B circuit is opposite to that of the Main Circuit Breaker but when racked out or open, the B circuit should still be closed but in traditional mechanical systems the racking out opens the main circuit breaker AND also disengages (or uses an MOC to maintain) the B circuit. It is desired for the B circuit to remain closed even if the racking out of the circuit breaker is in effect and without doing so with an MOC. The present invention solves this problem in a substantially electrical, elegant, and non-mechanical linkage manner.

The present system includes a movable electrical connector block mounted on the draw out breaker trolley or carriage and a stationary mounted and mating electrical connector block in the switchgear cubicle which when connected provide both A and B circuits. The present invention uses "make before breaking" shorting contacts to ensure that the A and the B circuits operate as desired, whether the circuit breaker is racked in or out.

As mentioned, a mechanical device for the B circuits to be maintained opposite to that of the circuit breaker's condition has been tried in the past, but it was problematic. It can require maintenance, repair and replacement. That is undesirable. The present invention solves the issue.

In addition, connecting large gangs of a pair of mating electrical connector block halves (having metal projecting pins and frictionally receiving metallic bores as required by the present invention) can be difficult as the pins and bores are tightly fitted components for ensuring secure electrical connections. Separating and connecting these block halves, when the circuit breaker is racked out and then back in, would be difficult as it requires a strong pull to separate this many pins and bores which are electrically held together by friction fits. Yet, it is desirable to provide a Test Condition, with the auxiliary circuits, when the circuit breaker is racked out. Thus, an embodiment of the present invention provides a mechanism for facilitating the mating of the connector blocks, when auxiliary circuit connection is desired, and the uncoupling of the connector blocks, when manual disconnection (for a Test Condition) is desired if the circuit breaker is in a conditional position known as the "test position." The rod facilitates the connection and disconnection of the mating connector blocks under conditions of testing the capabilities of the circuit breaker without connecting its main primary power connection to the associated switchgear cubicle. This is known as putting the breaker into a "Test Position."

Auxiliary A & B contacts are derived from a two position multi-stage switch known in the industry as an MOC (Mechanism Operated Cell) switch. For reasons of reduced complexity, maintenance and longevity amongst others, it is desirable to have such a switch physically mounted directly on the draw out circuit breaker trolley half and operated directly by the circuit breaker's operating mechanism.

The present invention contemplates and provides a rod with a first end connected to the rear of the movable half of the electrical connector blocks (on the back of the circuit breaker) which rod extends longitudinally forwardly to and through the front panel of the circuit breaker. There, the proximal end of the rod is provided with a handle. The rod facilitates the connection and disconnection of the mating electrical connector blocks. Pushing the rod through the circuit breaker's chassis or trolley and towards the rear of the cubicle will push the connector block half secured to the movable circuit breaker to mate it with the electrical connector block half located on the rear and stationary wall of the cubicle. This pushing of the rod facilitates the connection of the halves of the block connectors, with the pins being received in the bores of the respective block halves. Then, when desired, the rod can be pulled outwardly to disconnect the two halves of the block connectors, separating the pins from their respective bores. The mechanical advantage for the pulling out of the pins from the bores is facilitated by a fulcrum on the front panel of the movable circuit breaker. The rod is made of three segments and these are coupled and hinged to one another by cooperating pairs of U-shaped connections. The rod can thus be straightened or bent at the U-connections. When straight, the rod segments allow for pushing the movable (on the circuit breaker) half of the connector block towards the other connector block (the stationary connector block half). When the rod segments are bent about the proximal U-shaped connections, the proximal segment of the rod can be levered against the fulcrum on the front panel to pull the other segment of the rod outwardly, and since the rear or distal end of the rod is connected to the male connector block, this leveraging will facilitate the separation of the pins from the bores, i.e., to separate the otherwise mating connector halves.

This ease of connection and disconnection is facilitated by a hinged and segmented rod and by the provision of and location of a fulcrum on the front panel of the switchgear. The fulcrum provides a leverage point and mechanical advantage to the pulling of the electrical connectors of the auxiliary circuits apart. After use in providing a Test Position or Condition, the rod can be bent and its proximal segment secured to the front of the switchgear when it is not needed and, yet, it is simple to place the same into unbent position for pushing the connector blocks together. And, for disengagement of the same, leveraging the rod, when hinged about the U-shaped connection, knuckle or joint, against a front-located fulcrum member, preferably a hard metal or rubber piece with an apexed fulcrum like surface will pull the connectors apart, after the Test Position and analysis is completed.

SUMMARY

In general, in one aspect, exemplary embodiments of the present application provide apparatus and a system for controlling the status of main and auxiliary circuits of a circuit breaker housed in a cubicle or cavity and removably connected (racked in and out) from the switchgear housing, cubicle or cavity. When racked in, the auxiliary A and B circuits operate as intended and expected; A circuits in synchrony with the status of the main circuits of the circuit breaker(s) and the B auxiliary circuits in asynchrony to the status of the main circuits of the circuit breaker(s). Auxiliary A circuits are open and closed just as the main circuit breaker is open and closed. Auxiliary B circuits are closed and open in opposition to the open and closed condition of the main circuit breaker. A circuits are synchronous and B circuits are asynchronous.

However, while racking out (for repair, replacement or maintenance) and opening the main circuit breaker(s) will result in the A auxiliary circuits as reflecting "open" (as desired), the B auxiliary circuits will, absent the present invention or a mechanical linkage, also show an open condition when it is actually desired for them to maintain their opposition to the condition of the main circuits, i.e., they should be closed even if the main circuitry is open. This is solved by the present invention.

The present system includes a first electrical connector block and a second and mating electrical connector block which when connected provide both A and B auxiliary circuits for wiring out to other components and the electrical connector block halves when coupled (as when the main circuit breaker is racked in) complete the main and auxiliary (A and B) circuitry. The A circuits will be in synchrony with the status of open or closed circuitry of the main circuit breaker. This is true even if the circuit breaker is racked out and the connector block halves are disengaged as that shows an open main set of circuits and the A circuits will also be opened.

The system also includes a set of B auxiliary circuits. When the circuit breaker is racked into the cavity, these B circuits will be opposite (asynchrony) to the status or condition of the main circuit breaker, these should be opposed or open when the main circuit breaker is closed and the B circuits being closed, when the main circuit breaker is open. This, too, is accomplished by engagement of the electrical connector block halves, one on the relatively stationary sidewall or backwall of the cavity and the other connector block half secured to the movable main circuit breaker.

In addition, however, by virtue of the connector block halves and make before break circuits with shorting contacts and isolating fins described herein, the B contacts and auxiliary B circuits will remain closed even when the main circuit breaker and its connector block is removed or racked out of the cavity. This is done by the design of the connector blocks, the shorting contacts, and the removal or disengagement of the isolating fins, not by a mechanical device which is subject to failure.

A stationary electric connector block is secured to the inside of the cavity, the side or backwall of the cavity holding the circuit breaker. The mating movable electrical contact block half is secured to the movable circuit breaker which goes in and out of the cavity, racking in for use and out for repair or maintenance. The movable connector block is aligned with and will mate with the stationary connector and complete the auxiliary circuitry when the circuit breaker is racked into the cavity. When the main circuit breaker is racked in, the two connector block halves will mate. Pins of one block slide into and are frictionally gripped within bores of the opposed block, a pin and a bore providing mechanical and electrical connection for the auxiliary A and B circuits.

The moving secondary half of the contact block assembly that is mounted on the draw out breaker trolley is wired to a two position, multi-stage switch that is also mounted on the draw out breaker trolley. This two position multi stage switch is directly operated by the draw out breaker's operating mechanism to be in a status position of 1 (rest) or 2 activated. In each position the switch has contacts that are open or closed and thereby designated as A or B contacts depending on the Synchronicity or Asynchronicity with the Circuit Breaker's Main Contacts.

The connector block halves have a first contact set of A pins and corresponding receiving bores to complete the A circuits. The pins and bores are metallic and act as electrical contacts and connectors. Wiring out of these A contacts result in the A circuits. The blocks include locations and securing screws for holding the wiring out of the auxiliary circuits. The blocks thus include one or more first contacts that are in the closed position when the main circuits of the circuit breaker are in the closed position and that are in the open position when the main circuits of the circuit breaker are in the open position. These are the A circuits. And, when the connector blocks halves are separated, as by racking out, the open condition of the circuit breaker will be in synchrony with the now open A auxiliary circuits.

The connector block halves held by the movable circuit breaker and the stationary side or bottom wall of the cavity, when mated in the cavity, also provide a set of B contacts and circuits. These are B circuits and are wired out to operate opposite to the condition of the condition of the main circuit breaker—open B circuits when the main circuit breaker(s) are closed and closed B circuits when the main circuit breaker is open. This is referred to as absence of synchrony (or asynchrony) between the condition of the main circuit breaker(s) and the B auxiliary circuitry or wiring out. If the circuit breaker is opened, the present invention nevertheless provides for a closed or complete circuit of the B auxiliary circuits. That is, the B circuits are still asynchronous. And, if the circuit breaker is closed then the B auxiliary circuits are open. The connector block halves will let the B circuits operate as they should, i.e., stay asynchronous to the condition of the main circuits, particularly they will stay closed, even if the racking out results in open main circuits.

When the circuit breaker is racked out of the cavity, the B circuits, according to the present invention, will still reflect, as they should, closed auxiliary B circuits. This is all accomplished by a set of make before break contacts and isolating and non-conductive fins or walls located on opposed parts of the connecting block halves. These fins or walls, on the movable connector block i.e., the one secured to the circuit breaker, prevent the shorting of the B auxiliary circuits by the shorting contacts unless the halves of the connector blocks are separated (as when the circuit breaker is racked out). The electrically isolating fins or walls, when the circuit breaker is racked in, block the completion or shorting of the B circuits i.e., they prevent the make before break contacts from connecting to the outside wiring. When the main circuit breaker is closed—the B circuits are wired open. And, when the main circuit breaker opens, the B circuits are closed. And, when the circuit breaker is racked out of the cavity, the connector blocks physically separate and the removal of the isolating fins or walls allow the shorting clips otherwise referred to as the make before break contacts to contact, short and complete the auxiliary B circuits. Thus the isolating walls do not interfere with the operation of the B circuits when the breaker is fully operational or racked in (they keep the shorting contacts out of electrical connection to the wiring of the B circuits) but allow the make before break contacts or shorting clips to complete the B auxiliary circuits when the connector blocks are disconnected and the circuit breaker is racked out.

When the circuit breaker is racked out, the system's fixed mounted cubicle side make before break contacts (no longer isolated from the wiring of the B auxiliary circuits) serve to allow the external wiring in the B circuits to remain complete, i.e., they are shorted to complete and maintain the B circuit so that, during racking out, the B circuits are closed and still opposite to the main circuit condition (open). Replacing (racking in) the main circuit breaker into the cavity will again allow the B circuits to be in non-synchrony because the fins or walls of one connection block half will separate or block the make before break contacts from completing the B circuits so that once again, an opening of the main circuit breaker will be reflected by a closing of the B contacts and vice versa.

Implementations of the various exemplary embodiments of the present application may include one or more of the following features. The stationary connector block is preferably secured to the side or rear wall of the cavity. It is provided with a set of receiving metallic bores. The movable connection block half comprises one or more metallic and projecting pins, meant to be received by the stationary bores. Both connector block halves have wiring contacts for the out-wiring of circuits. The metallic pins of the movable connector half slide into and frictionally mate with the metallic bores of the stationary connector block half. The A circuit set includes one or more wiring contacts that are in an open position when the main contacts of the circuit breaker are in the open position and that are in the closed position when the main contacts of the circuit breaker are in the closed position. The one or more A circuits are in an open position even after the auxiliary connector blocks are separated, as when the movable connector block half is withdrawn from connecting with the stationary connector block. The two connector blocks also have one or more, preferably several, B circuits for wiring out those auxiliary circuits.

The two connector block halves, movable and stationary preferably include many, up to 26, preferably, receiving bores and pins, each bore having a rear connector element for the hard wiring of one wire of the A or B wired out circuit and each pin also having a rear connector element for the hard wiring of one wire of the A or B wired out circuit. The movable connector block has pins (up to 26 for example) which slide into and frictionally and electrically connect and mate with the corresponding bores of the stationary connector block. When the two blocks are connected, the pins are in the bores, and the wiring connected to the pin and bores complete the A and B auxiliary circuit(s).

When the connector block halves are connected (racked-in position of the circuit breaker within the cavity) the A circuits are in direct synchrony with the condition of the main circuit breaker and the B circuits in asynchrony with the condition of the main circuit breaker's condition. The A circuits will be Open when the circuit breaker is open and closed when the main circuit breaker is closed. The B circuits will be closed when the main circuit breaker is open and open when the main circuit breaker is closed.

When the connector block halves are separated, as when the circuit breaker is racked out, the circuits of the A auxiliary circuit continue to reflect the open condition as the pins of the movable connector will be removed from the bores of the stationary connector and electrical connection of the A auxiliary circuits are broken. But to have the B circuits remain closed, even when the circuit breaker is racked out and the pins removed from the bores, sets of and electrically connected and metallic "make before break" contacts are no longer spread apart nor electrically isolated and make contact and complete circuits for those B circuits. When the movable connector block and the stationary connector block are connected to one another, the insulating fins or walls of non-electrically conductive material prevent the make or break shoring clips from completing a circuit and thus the B circuits are not completed by those clips or contacts. The make before break contacts will allow the completion of the circuit on the contact of the bore side but, if the connector blocks are connected, the fins or walls block the shorting contacts from affecting the B wired-out circuitry. When the connector blocks are separated and the isolating fins or walls removed from preventing the shorting contacts from making electrical connection with the wired-out connections of the B circuits, the wiring will complete a circuit. The insulating fins or walls slide between the shorting contacts and the connection to the bores but when removed, the shorting contacts, no longer spread nor space apart from the contacts with the bores, to complete the B circuits. Thus, the fins and walls ensure that the shorting contacts ae electrically inactive when the connecting blocks are mated as the fins/walls serve to prevent the shorting contacts from completing the circuits. But, if the connector blocks are separated, the fins or walls are removed from the spring-biased make before break contacts and this allows for a shorting—a complete circuit of the B wired-out circuits.

So, when connected, the connecting blocks provide A and B auxiliary circuits and the make before break contacts are isolated by the walls or fins from the circuitry and when the connector blocks are separated the A circuits are open and the B circuits still closed as the removal of the fins from the spring biased make before break contacts allow the make before break contacts to short and complete the B circuits.

In general, in one aspect, exemplary embodiments of the present application provide a cavity configured to have a circuit breaker move in as "racked in" and moved out as "racked out." The cavity, a stationary component, will have an auxiliary circuit connector block held within, the first connector block having a first set of wired contacts for the A and the B circuits. The A circuits will have hard wiring for A circuits that will be open when the main circuit breaker is open and will be closed when the main circuit breaker is closed. The same connector block also includes a set of B circuit contacts for hard wiring that will reflect open when the main circuit breaker is closed and closed when the main circuit breaker is open.

The stationary connector block in this example is located on the inside back wall of the cavity or stated another way, it is secured to the stationary side of the switchgear. It has the bores for mating electrical receipt of the pins of the other or movable connecting block held on the movable (racking in and out) carriage or trolley of the circuit breaker from the cavity. That block also has hard wiring for the A and B circuits. The pins of the movable connecting block are frictionally and electrically secured within the bores of the stationary connecting block. When so mated the A and B circuits are complete. The movable connecting block is held on the moveable circuit breaker. The stationary connecting block also comprises one or more make before break contacts which will complete the B circuits even when the connecting blocks are separated. Yet, the make before break contacts are kept electrically isolated by the insulating fins and walls of the opposed connecting block. When the connecting blocks are separated, the spring-biased and shorting clips will short circuit and connect the wiring of the B auxiliary circuit(s). Implementations of the various exemplary embodiments of the present application may include one or more of the following features. The movable and stationary connector block further comprise one or more securing locations for the hard wiring of the A and B circuits. When the connector blocks are coupled, the A circuits show an open position when the main contacts of the circuit breaker are in the open position and are in the closed position when the main contacts of the circuit breaker are in the closed position. When the connector blocks are connected, the B circuits are wired to be in asynchrony with the condition of the main circuit breaker, open when the main breaker is closed and closed when the main circuit breaker is open. But, the interaction of the electrically isolating fins and walls of the movable connections and the make before break contacts located at the bores of the stationary connector blocks, and the B circuits thereof, are ineffective when the blocks are connected but result in a short circuit, a complete electrical B circuit, when the connection blocks are disconnected.

Further, an aspect of the present invention relates to a mechanical lever-like device which allows an operator to easily and quickly connect and disconnect the connector blocks so as to allow implementation of a "Test Position" for the circuit breaker. Without this mechanism, the manual dis-engagement of the sliding pins from the bores could be quite difficult. As mentioned, the pins are frictionally held by the bores and thus if the connector blocks include, for example, 26 sets of bores and pins, the force to uncouple and couple could be quite large. The present invention provides a simple, frontal access mechanism for allowing the quick and easy coupling and uncoupling of the connector blocks.

BRIEF DESCRIPTION OF THE DRAWINGS

The aforementioned and other aspects, features and advantages can be more readily understood from the following detailed description with reference to the accompanying drawings wherein.

Figure 4:
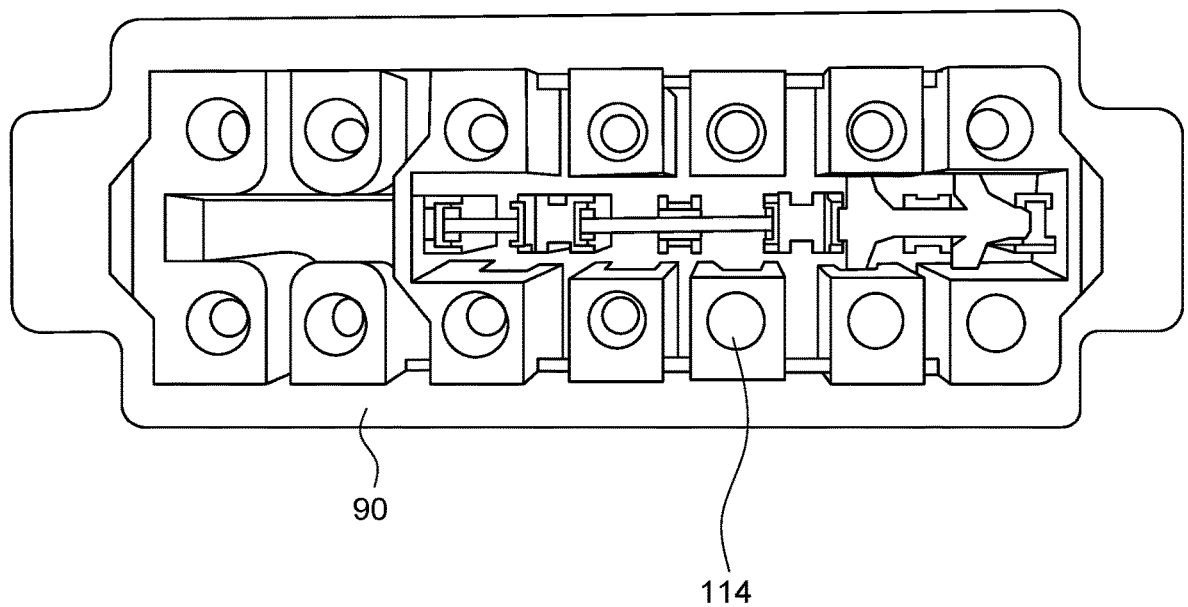
FIG. 4 is an enlarged and face-on view of one embodiment of a stationary 'female" half of the secondary electrical connector or contact block assembly. Shown are the female bore holes which accept the male pins of the moving half of the two-part electrical contact block assembly. In this FIG. 4, the right four (4) bores of this female contact electric block half have installed a 4-point shorting clip (FIG. 6). In this stand-alone condition, i.e., when the female half is not connected to the mating male contact half, the 4 prongs of the shorting clip touch and provide electrical contact with the metallic outsides of the bore holes and short out those circuit connection points thereby effectively maintaining circuit continuity. These bores of the female contact block will continue appearing as circuit complete B contacts to their connected wiring going to the outside auxiliary circuitry and will remain as such even for a fully removed drawn-out circuit breaker.
Figure 5:
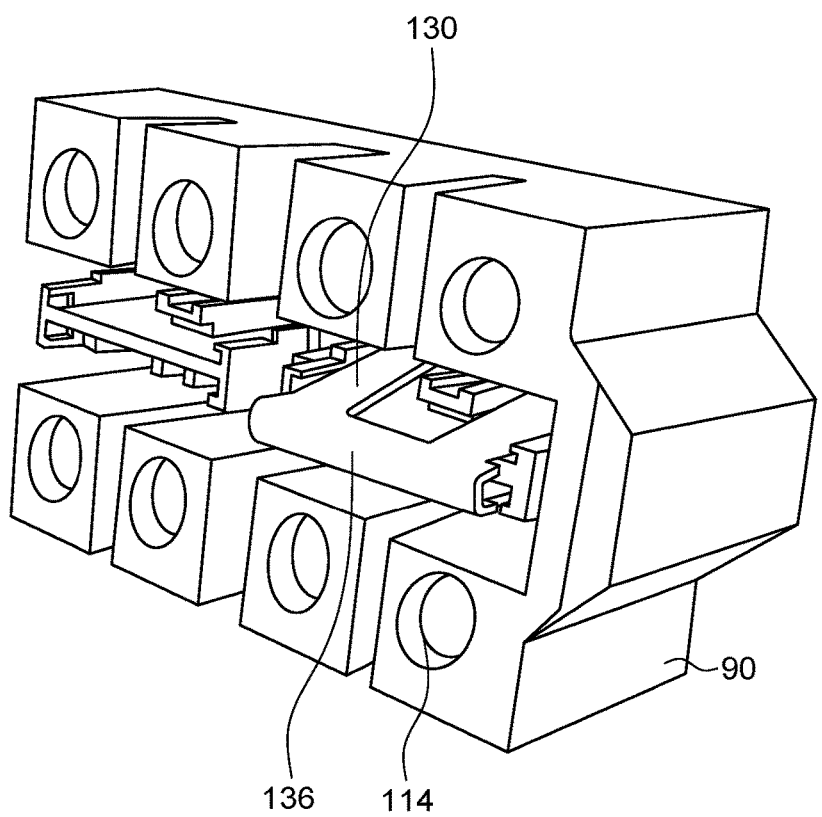
Figure 6:
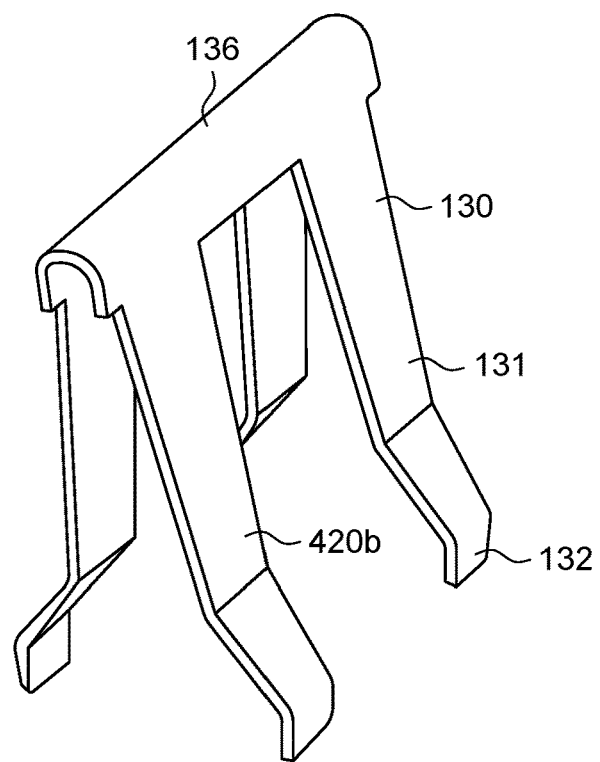
Figure 7:
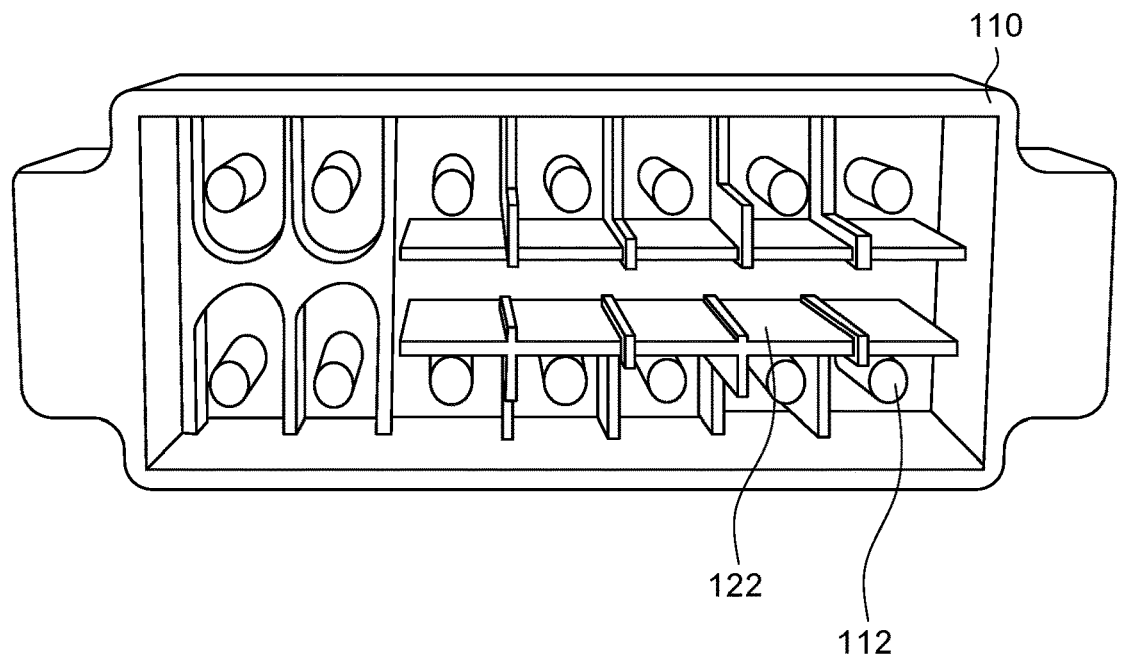
Figure 8:
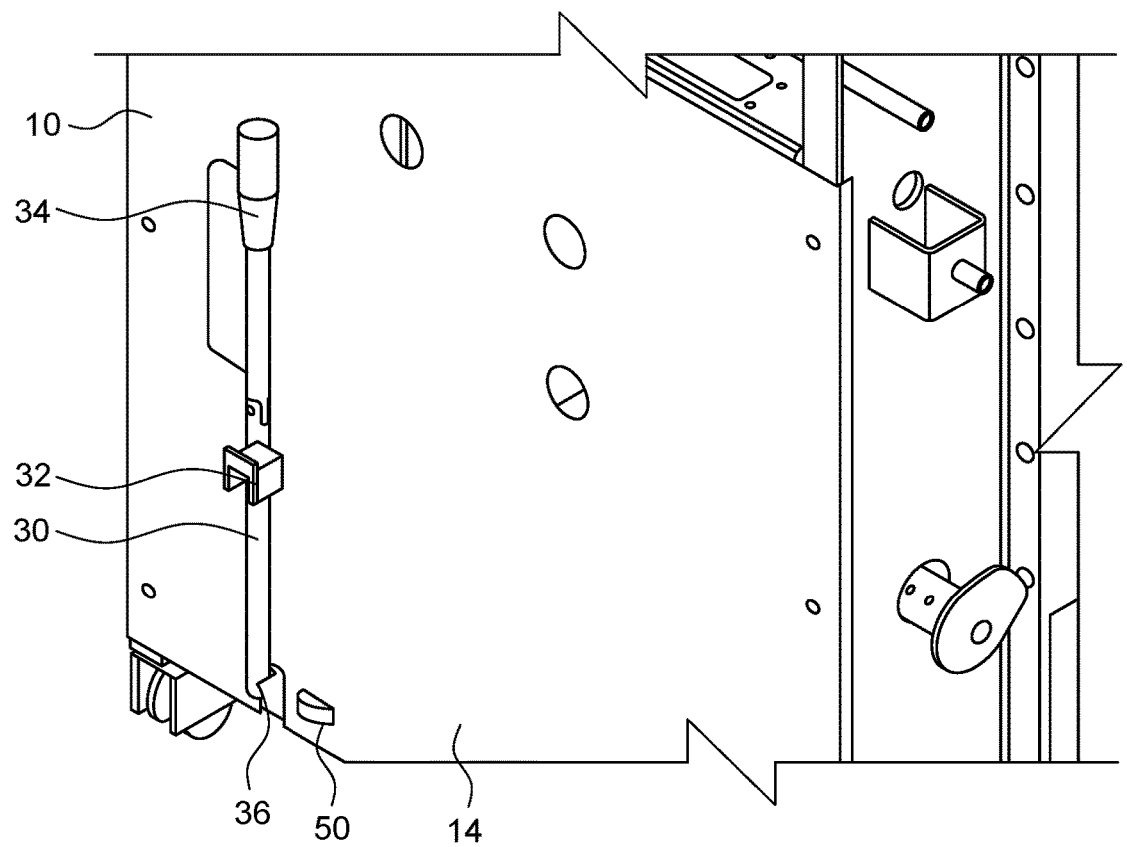
Figure 9:
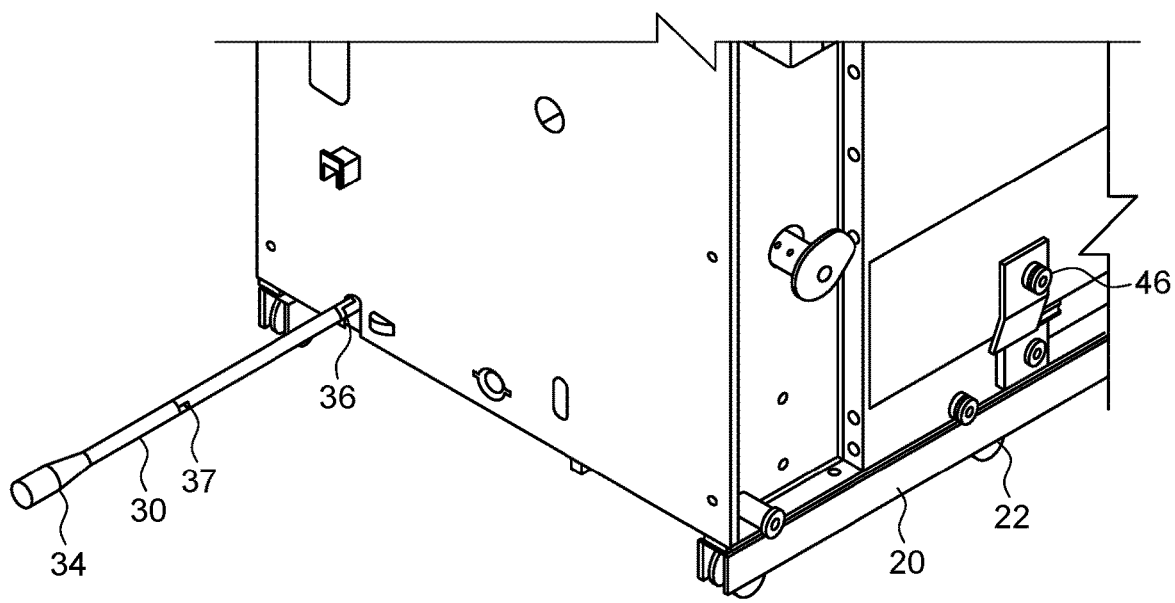
Figure 10:
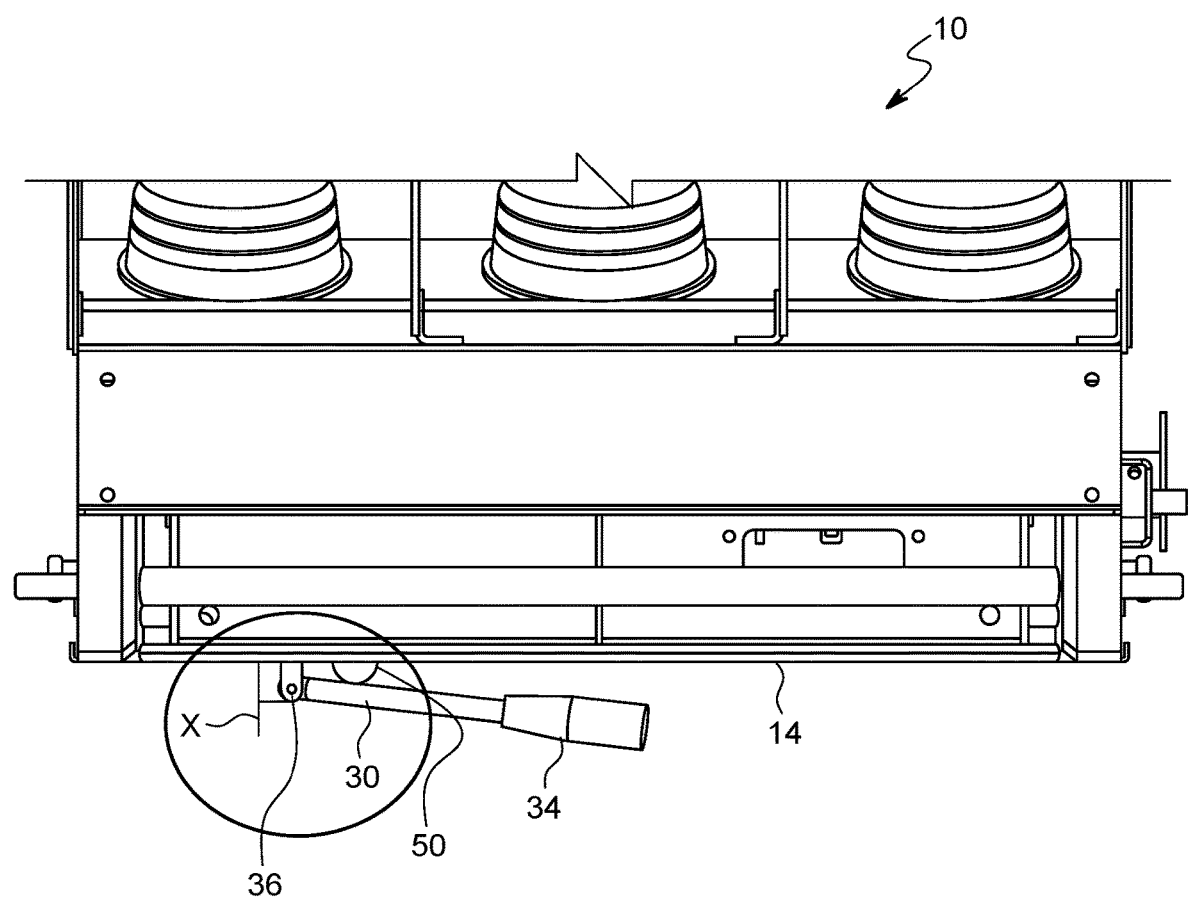
Figure 11:
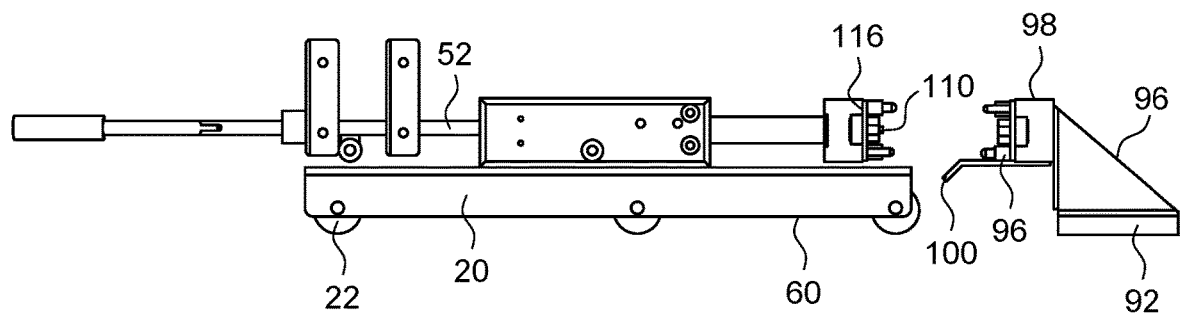
Figure 12:
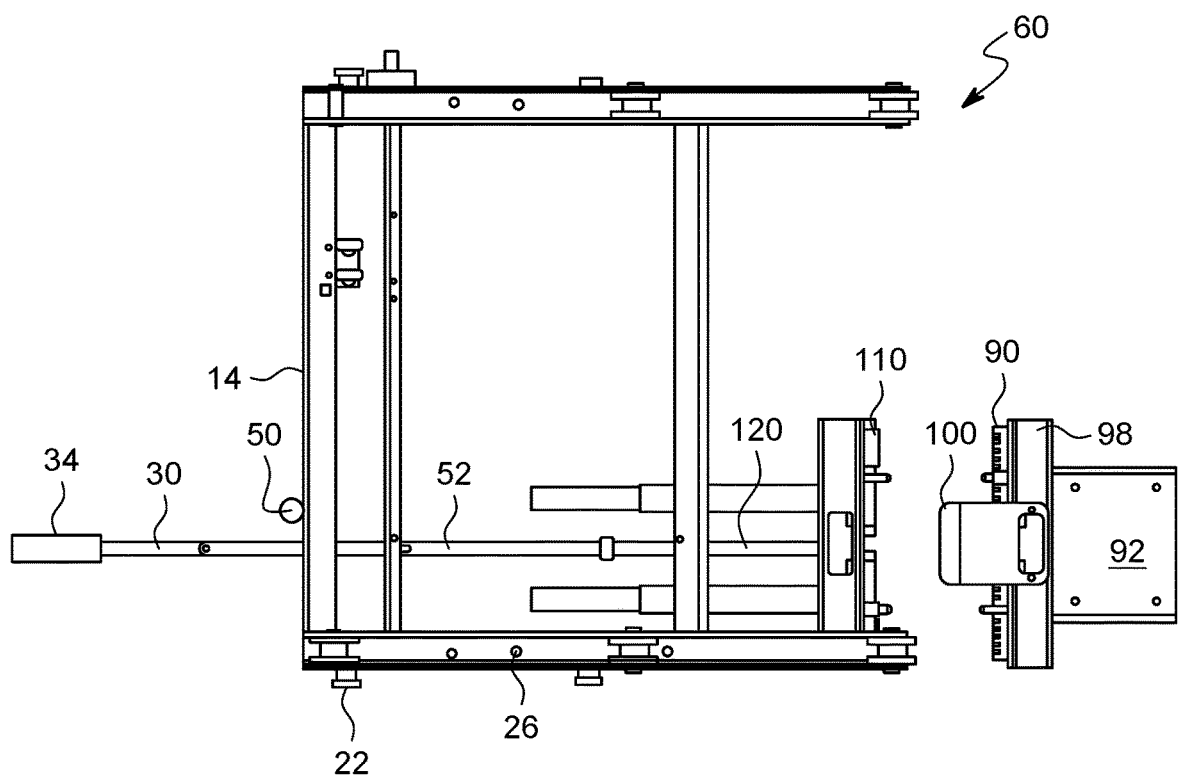

The female half of the contact block's bore holes without shorting clips will open normally and act as A contacts for an open or removed drawn-out breaker;

FIG. 5 shows an enlarged, partial front and perspective view of a stationary "female" connector block for auxiliary circuits, according to an embodiment of the present application—it is meant to be secured to a stationary inside wall, back or even ceiling or floor of the breaker's switchgear cubicle, housing or cavity for the movable, i.e. rack-able in and out (draw-out) circuit breaker with respect to its holding housing, cabinet or cubicle, etc. and here shows the four contact point shorting clip (of FIG. 6) for the creation of "B" type circuits—single, two (2) point shorting clips may be even more preferred for switchgear applications to create unitary B contacts so as to avoid "cross-talk" between shorted circuits;

FIG. 6 shows an enlarged and perspective view of a shorting clip for use in a B circuit portion of the stationary connector block shown in FIG. 4 and FIG. 5, capable of making before breaking, shown here is a four (4) points shorting clip which is equivalent to shorting and completing two (2) electrical circuits;

FIG. 7 is an enlarged, front perspective view of one embodiment of a movable and mating male half of the two-half auxiliary electrical connector assembly. When the two halves of the auxiliary connecting blocks are connected, the male half includes the insulating walls or fins for blocking the electrical contact of the shorting clips (clearly shown on FIG. 4). As the two halves separate and the fins pull away from the fixedly mounted female half—their removal allows the shorting clips (FIG. 6) to touch the metallic outside walls of the female contact bores and creates the "make before break" shorting connection(s). These electrical circuit contact points on the stationary female side of the connection block can now continue to maintain a closed circuit even though the breaker trolley and moving half of the secondary or auxiliary connector have been removed from the cubicle. These shorted points of the shorting clips therefore effectively act as electrically closed "B" contacts regardless of the breaker's position in or out of the cubicle (bear in mind that the only thing that makes the A and B circuits of the connector blocks operationally distinct is, when they are connected to and operable by, the wiring of the respective contact points of the two-position multi-stage MOC switch;

FIG. 8 shows a partial, enlarged, and side perspective view of the front panel of the circuit breaker and shows the connecting and disconnecting rod in its storage position, ready to be used to achieve a test condition;

FIG. 9 shows another partial, enlarged and front perspective view of the circuit breaker's front panel with focus on the manual operating handle for moving the secondary connector. Here the handle is in the lowered position and ready to be "pushed in" to move the movable secondary electric connector block so that it mates and connects with the stationary female connector half. Pushing the handle inwardly and fully, connects the two electric contact block halves even while the circuit breaker is in the drawn-out position such that the main primary connections are disengaged. This allows the breaker to have an electrically operational TEST position without turning on and off the Main Power Circuit;

FIG. 10 is an enlarged, partial top plan view of the circuit breaker with the manual operating handle for the moving secondary and male connector fully inserted and the two secondary connector block halves well secured into each other(not shown in this Figure). Dis-lodging the two electrical connector halves manually is difficult due to the compressive spring force and friction of the female bore holes grabbing on the male block's pins. Having an outer segment of the handle fitted with a U-joint; it is able to bend into an "L" and extend across the front panel. A simple fulcrum bumper on the breaker's front panel provides all the leverage needed to easily dislodge the two electrical connector secondary halves—done with a slight inward push on the handle. The full handle can then be easily withdrawn and replaced back into its rest or storage position (see FIG. 8);

FIG. 11 is a side view of the trolley or carriage for the circuit breaker and the supports and wheels for the circuit breaker and shows the extension of the connecting and disconnecting rod, its securement to the movable electric connector block half and relative positioning vis a vis the stationary connecting block for the auxiliary circuits (secured here to the floor of the cubicle). The stationary secondary electrical block half and its support are also herein depicted; and FIG. 12 is a bottom plan view of the carriage or trolley for the circuit breaker and again shows the extension of the connecting and disconnecting rod, its securement to the rear of the movable, male connecting electric block half, and its alignment with the stationary, female electric connecting block half—and the fulcrum bumper secured to the front panel of the circuit breaker used to ease the dislodgment of the connected secondary block halves is also visible.

DETAILED DESCRIPTION OF THE PREFERRED EMBODIMENTS AND THE DRAWINGS

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may tend to obscure the inventive aspects described herein.

Figure 1:
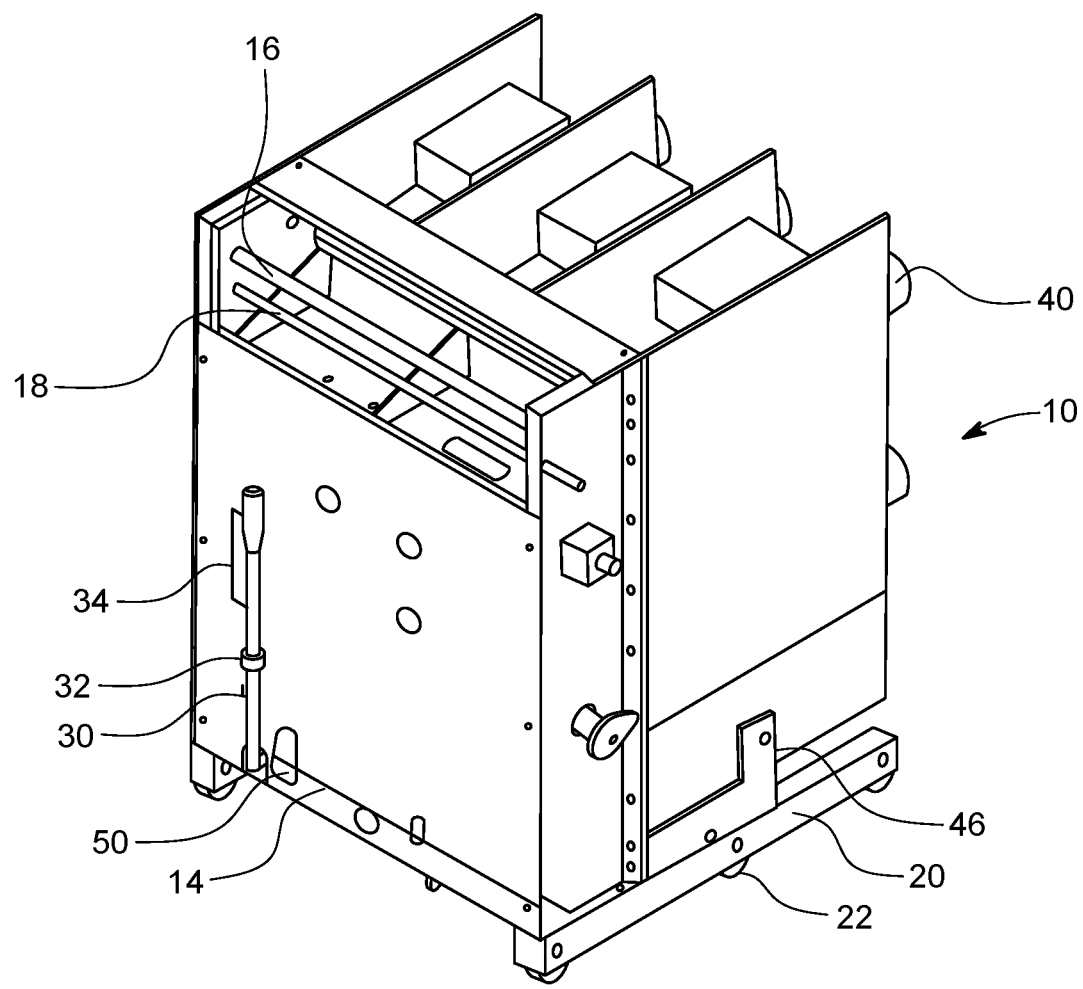
FIG. 1 shows a front and perspective view of a circuit breaker removed or racked out of its cubicle or housing.

Again, by way of background, a power circuit breaker mechanism is shown in FIG. 1 as it might appear after being removed or racked out of its housing. This model of a rack-in and rack-out circuit breaker actually has three main circuits with three rearwardly extending male connectors which, when racked into the cubical, are received by and electrically connect to female mating connectors to complete three circuits (known as three phase circuits). These are the main or primary circuits of the power circuit breaker. The circuit breaker is a well-known electrical component and with the male and female connectors physically connected, if a surge or other power distribution issue arises, the internal mechanism(s) will open to ensure that one or all main circuits cease current flow. This is how a circuit breaker basically operates.

The present invention is directed to a power circuit breaker of the movable type, i.e., it is capable of having the circuit breaker rack-able in and rack-able out, as manually done by technicians, for repair, replacement and/or maintenance of components. Generally, the circuit breaker is supported by bottom located side rails with rotatable wheels which mate with grooved rails in the cubical, housing or cabinet to allow ease of racking in and racking out of the circuit breaker with respect to its cabinet or cubicle. This, too, is well known in the industry. When racked in, a mechanical linkage will raise the access door (known as primary shutter assembly) to the female circuit receivers so that the male circuit projections on the rear of the circuit breaker can electrically couple. When the circuit breaker is removed or racked out of the cubicle, the access door is dropped down by mechanical linkage to close off and block access to the female circuit receivers, for safety purposes.

Figure 2:
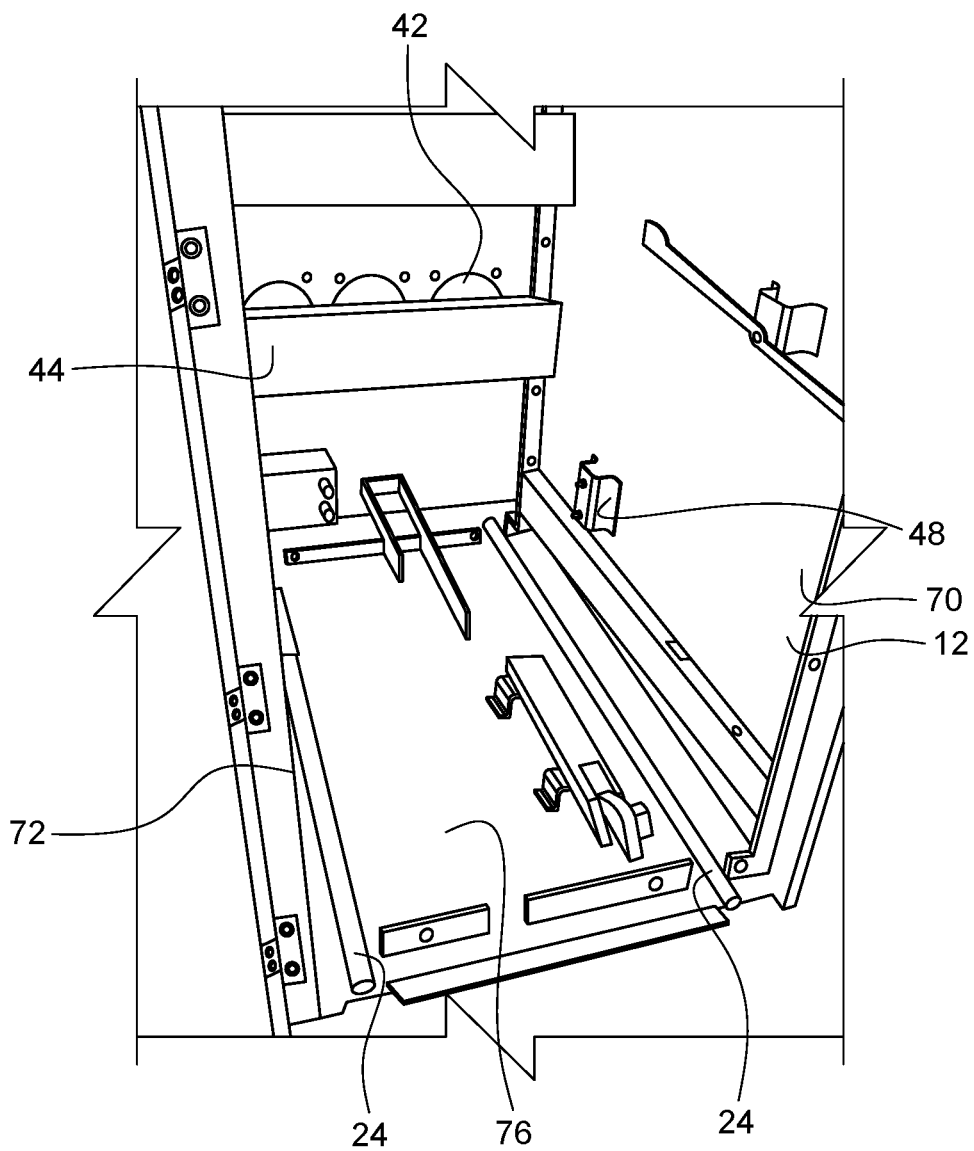
FIG. 2 is a front and perspective view, of the interior of the cubicle, with the circuit breaker racked out of the cubicle or cabinet.

FIG. 1 shows the circuit breaker 10, removed or racked out of its housing or cubicle 12 (See FIG. 2). It has a front panel 14, with a horizontally extending pair of rods 16 and 18, which when pulled together i.e., toward one another, like the handles of shopping carts in supermarkets or airports, will allow movement of the circuit breaker 10 on its wheels. This is a safety feature and allows movement of the circuit breaker into and out of the cubicle only when the rods are moved toward one another. These also allow for manual, hand-gripping for ease of pulling and pushing the circuit breaker 10 out of (racking out) and into (racking in) the circuit breaker 10, vis a vis the cubicle 12.

Figure 3:
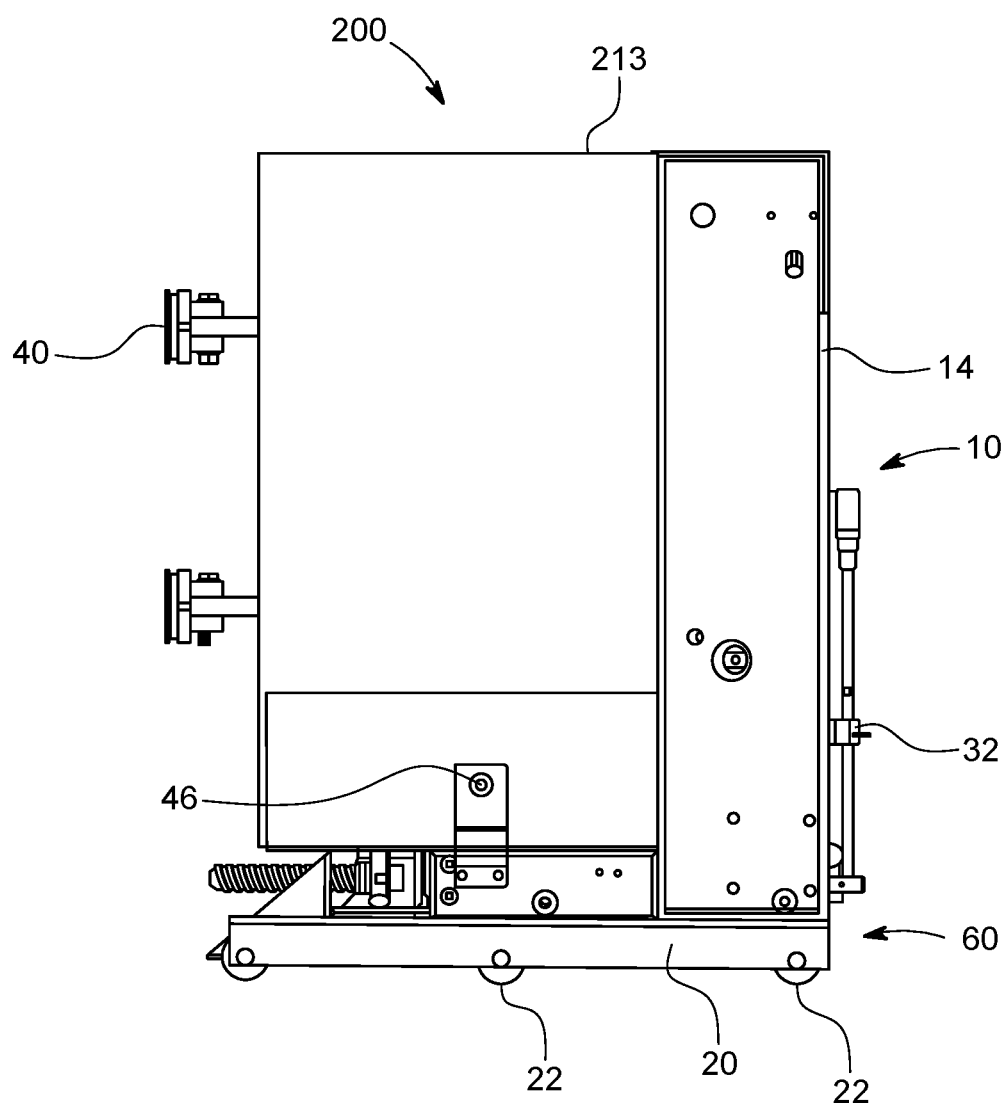
FIG. 3 is a left side view of the circuit breaker removed or racked out of the cubicle and shows the rod useful for connecting and disconnecting the connector blocks, with its proximal segment in its position of storage, i.e., non-use for connecting or disconnecting.

FIG. 1 shows the circuit breaker 10, removed or racked out of its housing or cubicle 12 (See FIG. 2). It has a front panel 14, with two heavy-duty horizontal rods 16 and 18. Element or rod 16 is a handle for moving the breaker in and out of the cubicle and around on the floor when it is withdrawn from the cubicle. Rod 18 is a second horizontally extending rod and comprises an upwardly movable solid rod that provides an industry required interlock function. This interlock function is such that when the breaker is moved in or out and arrives at the disconnect position—it must latch into place until such time that it is intentionally desired that it be moved. This rod 18 interlock will automatically latch and manually unlatch when pulled upwards toward handle 16. This manual unlatching would allow an operation and maintenance person to pull and remove the breaker from its interlocked disconnect condition within the cell. This is a very simple and rugged way of effecting a standards' required safety feature and allows movement of the circuit breaker into and out of the cubicle only when the rods are moved toward one another. These also allow for ergonomic manual, hand-gripping for ease of pulling and pushing the circuit breaker 10 out of (racking out) and into (racking in) the circuit breaker 10, vis a vis the cubicle 12. The circuit breaker includes a bottom side rail-like support 20 with wheels 22 (see FIG. 3) facilitating the movement of the circuit breaker. The wheels 22 need to be aligned with interior rails 24 of the cubicle 12 for allowing racking in of the circuit breaker into the cubicle 12.

Also visible in FIG. 1 is the movable secondary contact block assembly half's connecting and disconnecting rod 30 in its storage or non-use position, spring clamped against (and covered with a security latch) and extending from bottom upwardly towards the top, on the front panel 14. A small U-shaped spring biased clamp 32 can be selectively deployed to hold the rod flush against the vertical face of the front panel 14 and, as desired, when pulled outwardly (after removal of the latch) to release the rod 30, so that the handle 34 can be gripped and the rod either bent for use or straightened for pushing. The rod is straightened from front to back, as will be described hereinafter, for putting (by pushing on the rod) the circuit breaker into the Test Position. The rod can be used for disconnecting the auxiliary connector block halves or for ease of connection of the auxiliary connector block halves. A pair of U-shaped connector joints 36 and 37 are provided for facilitating the bending and straightening of the rod 30. A hard fulcrum 50, preferably a semi-cylinder, is secured with its flat side onto the front panel 14, to provide a pivot point and a mechanical leveraged advantage to the action of pushing the handle 34 (at the proximal end of the segmented rod) towards the front panel 14, to allow the shorter portion or proximal segment 52 of the rod 30 to move toward the front panel 14, to facilitate the ease of disconnection of the auxiliary connector block halves from one another.

FIG. 10 shows a partial top view of the movable circuit breaker and if a complete top view were shown, would illustrate the male main circuit connectors, which project rearwardly, and which will mate with the receiving female main circuit breaker connectors 42, when the circuit breaker is racked into the cubicle 12. The access door 44 is shown covering the female circuit breaker connectors 42 and will be mechanically moved upwardly to expose the receivers of the female circuit breaker connectors when a side-located camming mechanism 46, secured to the trolley or carriage 60, mechanically links with a mechanism 48 (see FIG. 2) connected to the access door 44. This, too, is well known in the industry.

The inside surfaces of the cubicle 12 basically comprise, the opposed side walls 70 and 72, the rear wall 74, a bottom wall or floor 76, and a top surface 78. The circuit breaker's front panel can be the front "side" of the circuit breaker or a closable and hinged extra door can be provided for covering much of the circuit breaker when it is fully received and racked into the cubicle. According to the preferred embodiment of the present invention, the female and stationary auxiliary electrical connector block half 90 is secured to the rear and floor of the cubicle 12. A flange 92 (see FIGS. 11 and 12) is secured to the floor 76. The flange 92 has a front facing plate 96 secured to it and front facing plate 96 is provided with a holding bracket 98. The holding bracket 98 holds the female, stationary auxiliary electrical connector block half 90, in this case, the connector block half extends forwardly and inwardly with respect to the cabinet or cubicle and across the width dimension of the cubicle from one side towards the other side. The bracket is open towards the front of the cubicle and holds the bores of the female, stationary auxiliary connector block half. The bores are parallel and extend from the rear of the cubicle and towards the front panel and the front of the cubicle 12. In an embodiment of the invention, the bottom of the holding bracket 98 is provided with a downwardly and forwardly projecting guide surface 100, which helps to guide the male, movable auxiliary electrical connector block half 110 for mating engagement with the female, stationary auxiliary electrical connector block half 90, during the racking in process. In the drawings (FIGS. 11 and 12) there are two female, stationary auxiliary connector block halves and two mating male, movable auxiliary connector block halves, with their projecting bores and pins aligned.

Male, movable (meaning secured to the movable circuit breaker 10 with respect to the cubicle 12) auxiliary connector block half 110 (see FIG. 7) is provided with the metallic projecting pins 112 which mate with and frictionally slide into the female, stationary auxiliary electrical connector block half 90 (see FIGS. 4 and 5) and its metal lined bores 114. The male, movable auxiliary connector block half 110 is itself secured to a face plate 116 which is secured to a bracket 118, secured to the front or distal end of the rod 30. Rod 30 is segmented and has a distal end 120 secured to the rear of bracket 118. Movement of rod 30 longitudinally into the cubicle 12 will cause the male, movable auxiliary connector half to approach and mate with the female, stationary auxiliary connector block half 90 and pulling it outwardly will disengage the pins from the bores, separating the male and female auxiliary electrical connector halves. The pins 112 will frictionally slide into and make firm electrical contact with the bores 114. Of course, the pins and bores are made of metallic materials for proper electrical contact. Along the length of the rod, various supports can be provided by the circuit breaker and/or through holes to ensure the support and transit of the rod, extending from front towards rear of the circuit breaker.

Lengthwise withdrawing of the longitudinal rod 30 from the cubicle will uncouple or disconnect the movable, male auxiliary connector block half 110 from the female, stationary auxiliary connector block half 90. This is done by first unlatching the rod 30 from the front panel 14. Then the rod is pulled from the spring clip. Then, the rod is bent about its U-shaped connector so that the proximal segment of the rod extends horizontally along the face of the front panel 14. In this position, part of the rod 30 will bear upon pivot or hard fulcrum 50. Further pushing of the proximal end or handle 34 of the rod towards the face or front panel 14 of the cubicle 12 will cause the distal end 120 of the rear end of the rod to forwardly (with respect to the cubicle) pull the rear of bracket 118. The fulcrum makes the proximal segment of the rod mechanically efficient so that a simple inward push of the handle towards the front panel will easily separate the two auxiliary connector halves. Suitable space may be provided for the uncoupling of the auxiliary connector halves without the circuit breaker being fully removed from the cubicle and that same spacing allows for the circuit breaker to be fully pushed into the cubicle and, yet, the auxiliary connector halves do not necessarily couple until the rod is forcibly pushed into the cubicle.

Pushing against the handle, the rod bearing against the fulcrum, will cause the male, movable auxiliary connector block half 110 to be separated from the female, stationary auxiliary connector block half 90. Separating the two halves of the secondary electrical contact assembly undoes the circuit breaker from the Test Position. And, as mentioned, the halves can be reconnected after testing, for then racking in and activating the circuit breaker. The rod and handle can then be rotated back to the position they had where the rod was vertical and the rod secured to the front panel within the spring and held there by clamp 32.

If the circuit breaker is racked out, such that it is in the disconnect position and it is then desired to completely remove the breaker from its cubicle for maintenance, repair, inspection, etc. the two rods 16 and 18 are gripped such that the lower rod 18 is raised towards 16. This unlatches the Disconnect Position safety interlock. Maintaining the grip while manually pulling on the handle 16 allows the breaker's six wheels 22 to guide the circuit breaker along the cubicle's floor-mounted rails such that the breaker moves directly forward and ultimately out of the cubicle or cell and onto the floor in front of the switchgear cubicle.

At the point in time that it becomes desirous to place this or another similarly rated circuit breaker back into the cubicle, the operator simply aligns the wheels 22 with the two floor rails and pushes on the handle 16. The Interlock rod will automatically ride up on the Disconnect interlock cell brackets as the breaker engages into position. Should it be desirous to electrically test the breaker now that it is in the cubicle but NOT have the main power circuits open and close during the testing of the breaker; medium voltage draw out breakers and switchgear have a TEST position that engages the secondary contact circuits but NOT the main breaker contacts. To have the circuit breaker of FIG. 1 electrically operate in its TEST position such that it can open and close and provide control circuit indications but NOT have the main power contacts make up with the stationary primary power contacts in the rear of the cubicle (found behind the shutter assembly) the Operator will unhook clamp 32 and easily pull the handle 34 of the breaker that is in the Disconnect position down so that it is horizontal. The operator will then hold the handle and rod perpendicular to the front panel 14 (i.e. the rod extends straight out of the front panel) of the circuit breaker 10 and with the proximal segment of the handle aligned with the distal end 120 of the rod 30, the rod can be firmly pushed rearward so as to reconnect the two halves of the auxiliary electric connector assembly (i.e. the male and female block halves). The male circuit breaker connectors 40 will connect with the female circuit breaker connectors 42 and the circuit breaker can now be electrically operated in this TEST condition such that all manners of functionality will exist—EXCEPT—no main power will flow through the main power contact circuits.

The proximity of the rear of the circuit breaker 10 near to the rear wall of the cubicle allows the rod to couple and uncouple the auxiliary connectors. Pushing the end and handle 34 and proximal end of the rod 30 inwardly causes the male, movable auxiliary connector block half 110 and its pins 112 to mate with the bores 114 of the female, stationary auxiliary connector block half 90. After coupling of the two auxiliary connector block halves 90 and 110, the rod 30 and its proximal segment portion will be bent upwardly about the U-shaped joint 36, so that the proximal segment of the rod is resting along the face of the front panel 14 and the spring clip and clamp 32 then secure the rod 30 in a storage position.

It should be appreciated that a preferred embodiment of the invention contemplates a pair of U-shaped joints or hinges, one located at about five inches from the top of the handle 34 and a second U-shaped joint or hinge located, preferably at about 10 inches from the top of the handle 34. These joints are similar to the U-joints beneath a truck for providing driving movement of the truck to rear axles from the drive train of the motor of the vehicle. The second and similar U-shaped hinge connects to the distal end of the rod. When the rod is in the storage position it will be at or near the bottom of the movable circuit breaker and the first hinge or U-shaped joint located just above the clamp 32. These hinges can be provided with mechanical connections or devices (like a trough) for the rod segments, to maintain the rod in its various positions for use in pulling apart the two auxiliary connector halves for and in coupling the same. Again, pulling apart is accomplished by leveraging the proximal end of the rod against the stationary pivot point or fulcrum to pull the distal end of the rod and the male auxiliary connector block out of contact with the female auxiliary connector block. Coupling requires a straightening of the rod segments so that an operator can simple push the male and female auxiliary connector block halves together for electrical and mechanical coupling. After each operation, the rod and its proximal segment can be placed back into its storage position, held by the spring clip and clamp.

While the present invention relates to a racking in and racking out circuit breaker into and out of, respectively, a housing or cubicle, the mechanism for racking in and out can be accomplished in various manners. A screw threaded rod secured to the circuit breaker chassis and passing from and through the front panel towards the rear of the cubicle can be used so that rotation of the rod (by hand, a crank handle or by a rotation device, like a drill) will cause the leading end of the rod to be captured by a stationary threaded bolt, secured to the rear or near the back wall of the cubicle. In this manner, rotation of the rod will cause the circuit breaker to be pulled into the cubicle and opposite rotation will cause the circuit breaker to be pushed out. This and other mechanisms for racking in and out can be used.

The present invention also relates to the use of a set of "make before breaking" set of electrical contacts for some of the auxiliary electrical circuits. According to the present invention, for example, both the "A" circuits and the "B" circuits may be connected to visual or audible indicators of the status of the primary circuit breakers. Some, for example, A auxiliary circuits ae generally in synchrony with the status of the main circuit breaker's status. Others, the B auxiliary circuits are in asynchrony so that they close when the main circuits are open and are open when the main circuits are closed. These A and B low voltage and low amperage circuits help to communicate information, monitor status, and are highly useful in the control and understanding of the condition of the main circuit breakers. Generally, the A circuits are in synchrony with the status of the circuit breaker while the B circuits are in opposite status or in asynchrony to that of the circuit breaker.

Generally, when the main circuits are open or when the circuit breaker is racked out of the switchgear cell, the "A" circuits remain open and the "B" contacts remain closed. On the other hand, when the main circuits are closed which can only happen when the circuit breaker is racked into the cubicle, the "A" circuits shift to a closed position and the "B" circuits shift to an opened position. In other words, the "A" circuits move or reflect in conformity with the condition of the main circuit breaker, while the "B" circuits are in opposition with that of the main condition or status of the circuit breaker.

According to the present invention, a switchgear housing or cavity or cubicle includes a stationary, female auxiliary electrical contact block 90 and a movable, male auxiliary electrical contact block 110. The stationary contact block 90 has aligned bores with metallic linings, and is configured to mate with the movable contact block 110 and its aligned pins so as to create one or more complete circuits—some to be wired out as A circuits to be in synchrony with the main circuit breaker and some to be wired out as B circuits, in asynchrony with the main circuit breaker.

As shown in FIGS. 4 through 7, the stationary contact or connector block 90 includes a molded hard plastic and insulating housing that comprises one or more bores which are lined with metal for electrical connection and, in their rears wire holding compartments which are meant to hold and secure the hard wiring out of circuits, the wires being secured by screws. This type of stationary female auxiliary connector block can be obtained from Wain Electrical Co., Ltd. of 759-3, Chengbei Industry Zone, Chanyuan Road Xiamen, Tong'an District, Xiamen, China, and has current part number: HEE 046FC. These female auxiliary electric connector blocks are provided with one or more sets of shorting clips for the B set of auxiliary circuits.

The male auxiliary connector block halves 110 are provided with metallic pins which mate into the metallic-lined bores of the female auxiliary connector block halves. These mating male auxiliary connecting and coupling block halves can also be obtained from Wain Electrical Co., Ltd. It bears current part number: HEE 046MC. These mating components, female and male block connector halves, are referred to as Female and Male 26 Pin, 20 amp, 500 V connectors. The male connecting block halves 110 have outwardly projecting insulating walls and fins 122 extending only for part of the length of the connecting block, which walls and fins 122 slide into the female connecting block halves 90 (some of which are provided with shorting contacts 130) to insulate the metallic shorting contacts 130 (one of which is shown in place in FIG. 5 and in full perspective in FIG. 6) from completing a circuit, when the block halves 90 and 110 are together and, yet, when separated, the shorting contacts 130 make electrical contact with the wiring in the B circuits to provide "make before break" circuits. These will be for the B circuits which are meant to operate asynchronously whether the circuit breaker is open or closed and even if the circuit breaker is racked out of the cubicle. The tips of the shorting contacts will touch the outsides of the bores to complete the circuit, when the walls and fins of the male connector are separated from the female connector.

When the female auxiliary connector 90 is connected to the male auxiliary connector 110, pins 112 are received by bores 114, and electrical connections are made for the wiring secured to the connectors in the A and B circuit sections. The A circuits will be wired in synchrony with the status or condition of the main circuit breaker's condition, open or closed. The B circuits will be wired to be in asynchrony with the status or condition of the main circuit breaker's condition, closed or open. The insulating fins and walls 122 of the male auxiliary connector slide into the spacing between the outside edges 134 of the top portion of the legs of the shorting clips 130 and the metallic outside of the rear sections of the bores. The shorting clips 130 have resilience and will compress about their heads 136 and the legs 132 thus separated from the outside of the bores 114. This insulates the legs 132 from making direct electrical and physical contact with the outside walls of the cylindrical bores 114. When the male and female connector block halves are separated, by racking out, the fins and walls 122 no longer separate the legs 132 from electrical contact with the outside walls of the metallic bores. And, of course, the springiness and resilience of the shorting clips causes them to spread back outwardly so that the legs 132 are in physical and electrical contact with the outside cylindrical surface of the bores 114. This results in electrical connection between the pins, the bores and the wiring to the female auxiliary connector for the B circuits. There will be electrical continuity—a consequence of the shorting clips making contact with the bores. This allows the B circuits to operate as desired—asynchronous, even when the circuit breaker is racked out of the cubicle. The operation and structure of the auxiliary male and female blocks, whether connected to one another or separated, with the shorting clips and insulating walls and fins is well known to those of skill in the field as "make before break" contacts. The preferred embodiment is shown herein but other make before break contact mechanisms can be employed in the invention. The concept is the use of make before break connectors for the B contacts in a power circuit breaker of the rackable in and out type.

The aforementioned specific embodiments are illustrative, and many variations can be introduced on these embodiments without departing from the spirit of the disclosure or from the scope of the appended claims. Further, different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by one of ordinary skill in the art.

What is claimed is:

1. A system for maintaining coordination of synchronous and asynchronous condition of A and B type auxiliary circuits, respectively, of a power circuit breaker selectively removable from a cubicle for housing the same, the system comprising:
    a) a first auxiliary electrical connector block half secured to a stationary component of the cubicle;
    b) a second and mating auxiliary electrical connector block half securable to said first auxiliary electrical connector block half, said second and mating auxiliary electrical connector block half being connected to a movable circuit breaker mechanism, wherein said first and said second auxiliary electrical connector block halves are of the make before break type; and
    c) a rod secured to at least the second auxiliary electrical connector bock half, wherein connecting said first and said second auxiliary electrical connector block halves is performed through a relative sliding movement of said rod through said power circuit breaker to push said second auxiliary electrical connector bock half towards said first auxiliary electrical connector block half.

2. A system as claimed in claim 1 wherein said first auxiliary electrical connector block half is comprised of a least one A type synchronous circuit and at least one B type asynchronous circuit via the block halves having wired connections to a two position multi-stage switch mounted on said removable circuit breaker and switched from a first position to a second position by an operating mechanism of the circuit breaker.

3. A system as claimed in claim 2 further comprising at least one set of shorting clips associated with said first auxiliary electrical connector block half and cooperating insulative separating walls associated with said second auxiliary electrical connector block half, where the shorting clips and the insulative separating walls maintain asynchrony of the at least one B type asynchronous circuit when the circuit breaker is racked in and the first and second auxiliary electrical connector block halves are connected to one another and also maintain asynchrony of the at least one B type asynchronous circuit, including where said circuit breaker is racked out of the cubicle.

4. A system as claimed in claim 3 wherein said first auxiliary electrical connector block half comprises a set of bores and said second auxiliary electrical connector block half comprises electrically mating pins for frictional receipt by said bores when said first and said second electrical connector block halves are connected such that electrical connections are made and circuits of the at least one A type synchronous circuit and the at least one B type asynchronous circuit completed when said first and said second auxiliary electrical connector block halves are connected to one another.

5. A system as claimed in claim 3 wherein said shorting clips are physically and electrically separated from contact with the connections of said first auxiliary electrical connector block half when said first and said second auxiliary electrical connector block halves are connected to one another.

6. A system as claimed in claim 5 wherein said insulating and separating walls of said second auxiliary electrical connector block half provide the physical and electrical separation.

7. A power circuit breaker comprising a movable circuit breaker and a stationary housing cabinet for said circuit breaker having auxiliary electrical circuits of the A and B type to reflect an open condition or a closed condition of said circuit breaker wherein said auxiliary electrical circuits are provided with a first, movable electrical connector block secured to said movable circuit breaker, and a second mating electrical connector block secured to said stationary housing cabinet, wherein said first and said second electrical connector blocks have at least one B type circuit of the make before break type.

8. A power circuit breaker as claimed in claim 7 wherein said first and said second electrical connector blocks use cylindrical metallic pins and receptive metallic lined bores for making electrical and physical connections between said first and said second electrical connector blocks.

9. A power circuit breaker as claimed in claim 7 wherein the make before break type circuits of the at least one B type circuit comprise at least one shorting clip and at least one insulative wall for interaction with said shorting clips when said first and said second auxiliary electrical connector block halves are connected.

10. A power circuit breaker as claimed in claim 9 wherein said at least one shorting clip provides a circuit to said at least one B type circuit of said auxiliary electrical circuitry of said power circuit breaker when said first auxiliary electrical connector block half is separated from said second auxiliary electrical connector block half.

11. A power circuit breaker system of the rack-able in and rack-able out type comprising a movable circuit breaker with respect to a housing for the same, said circuit breaker having male connectors which mate with female connectors of said housing wherein a rod is secured to a first auxiliary electric circuit connector block secured to the movable circuit breaker, wherein a second and stationary auxiliary electric circuit connector block, mate-able with said first auxiliary electric circuit connector block, is secured to said housing, wherein movement of said rod provides for connecting and disconnecting said first and said second auxiliary electric circuit connector blocks to and from one another, and wherein said connection of said first and said second auxiliary electric connector blocks is a consequence of a relative sliding movement of said rod through said circuit breaker to push said first auxiliary electric circuit connector block towards said second auxiliary electric circuit connector block.

12. A power circuit breaker system as claimed in claim 11 wherein said rod is accessible from a front of said movable circuit breaker.

13. A power circuit breaker system as claimed in claim 11 wherein at least a segment of said rod is selectively secured and stored against a front of said movable circuit breaker.

14. A power circuit breaker system as claimed in claim 11 wherein said rod is segmented into a proximal end and a distal end, and said distal end is secured to said first auxiliary electric circuit connector block secured to said circuit breaker.

15. A power circuit breaker system as claimed in claim 11 wherein said rod is hinged along its length into a distal segment and a proximal segment, said housing having a fulcrum secured thereto for said rod and said proximal segment is leveraged for a mechanical pushing advantage against said fulcrum to move said first auxiliary electric circuit connector block away from said second auxiliary electric circuit connector block.

16. A power circuit breaker system as claimed in claim 15 wherein said fulcrum is secured to a front of said movable circuit breaker and said rod extends from a rear of said circuit breaker to said front of said movable circuit breaker.

17. A power circuit breaker system as claimed in claim 16 wherein said rod is provided with a U-shaped connection along its length to provide a distal end and a proximal end of said rod and said U-shaped connection facilitates rotational and bending movement of said proximal segment with respect to said distal segment while said segments are connected together to provide a leveraging of said proximal end about said fulcrum.

\* \* \* \* \*